US012579752B2

(12) United States Patent　　　　(10) Patent No.:　US 12,579,752 B2

Hill　　　　　　　　　　　　　　　　　(45) Date of Patent:　　Mar. 17, 2026

(54) SYSTEM AND METHOD FOR CREATING AND FURNISHING DIGITAL MODELS OF INDOOR SPACES

(71) Applicant: City Furniture, Inc., Tamarac, FL (US)

(72) Inventor: Andrew James Hill, Tamarac, FL (US)

(73) Assignee: City Furniture, Inc., Tamarac, FL (US)

( * ) Notice: Subject to any disclaimer, the term of this patent is extended or adjusted under 35 U.S.C. 154(b) by 306 days.

(21) Appl. No.: 18/186,629

(22) Filed: Mar. 20, 2023

(65) Prior Publication Data

US 2023/0230326 A1　　Jul. 20, 2023

Related U.S. Application Data

(63) Continuation-in-part of application No. 17/871,405, filed on Jul. 22, 2022, now Pat. No. 12,299,834.

(Continued)

(51) Int. Cl.
G06T 19/00　　　(2011.01)
G06T 7/12　　　(2017.01)
G06T 17/20　　　(2006.01)

(52) U.S. Cl.
CPC ............... G06T 19/00 (2013.01); G06T 7/12 (2017.01); G06T 17/20 (2013.01);
(Continued)

(58) Field of Classification Search
None
See application file for complete search history.

(56) References Cited

U.S. PATENT DOCUMENTS

| 12,299,839 | B2 | 5/2025 | Hill | |
| 2015/0310135 | A1* | 10/2015 | Forsyth | G06F 30/13 |
| | | | | 703/1 |

(Continued)

FOREIGN PATENT DOCUMENTS

| CN | 111507222 | A | * | 8/2020 | ......... G06K 9/00201 |
| CN | 112785643 | A | * | 5/2021 | ............. G01C 21/32 |
| CN | 113112600 | A | * | 7/2021 | ........... G06K 9/6247 |

*Primary Examiner* — Yi Wang
(74) *Attorney, Agent, or Firm* — Fish & Richardson P.C.

(57)　　　　ABSTRACT

Systems and methods for generating a digital model of a space and modifying the digital model are described. In one aspect, a system includes one or more computers and one or more storage devices storing instructions that, when executed by the one or more computers, cause the one or more computers to perform operations including: obtaining a point cloud representation of the space, the point cloud including multiple points; segmenting the point cloud into: (i) an inlier point cloud including multiple inlier points, and (ii) an outlier point cloud including multiple outlier points, where the segmenting includes: identifying, as the inlier points, the points of the point cloud that have at least a specified likelihood of being measurements of any of multiple planes of the space; and identifying, as the outlier points, all other points of the point cloud that are not identified as the inlier points; processing the inlier point cloud to generate a segmented inlier point cloud that includes, for each measured plane of the space, a respective plane point cloud representing the plane; and processing, using a neural network, the outlier point cloud to generate a segmented outlier point cloud that includes, for each of one or more objects detected in the space, a respective object point cloud representing the object.

20 Claims, 12 Drawing Sheets

Related U.S. Application Data

(60) Provisional application No. 63/224,823, filed on Jul. 22, 2021.

(52) U.S. Cl.
CPC .................... *G06T 2200/24* (2013.01); *G06T 2207/10028* (2013.01); *G06T 2207/20081* (2013.01); *G06T 2207/20084* (2013.01); *G06T 2210/04* (2013.01); *G06T 2210/56* (2013.01)

(56) References Cited

U.S. PATENT DOCUMENTS

| | | | |
|---|---|---|---|
| 2021/0334538 A1 | 10/2021 | Marotta et al. | |
| 2022/0244740 A1* | 8/2022 | Jiang ....................... | G06T 7/579 |
| 2023/0044630 A1 | 2/2023 | Hill | |
| 2023/0221120 A1 | 7/2023 | Bina et al. | |

* cited by examiner

TRAINING
ENGINE 800

SEGMENTED INLIER
POINT CLOUD 632*

53*

53*

53*

53*

OUTLIER POINT CLOUD 621*

60*

60*

60*

60*

SYSTEM AND METHOD FOR CREATING AND FURNISHING DIGITAL MODELS OF INDOOR SPACES

CROSS-REFERENCE TO RELATED APPLICATIONS

This application is a continuation-in-part application of and claims priority from U.S. patent application Ser. No. 17/871,405 filed on Jul. 22, 2022, which is a nonprovisional application of and claims priority from U.S. provisional patent application Ser. No. 63/224,823 filed on Jul. 22, 2021. The foregoing applications are incorporated in their entirety herein by reference.

FIELD

This specification relates generally to data processing, virtual modeling and virtual revision of a room, other indoor space, a patio, other outdoor space, and objects present in such spaces. More particularly, the specification relates to systems, software, and methods for creating a digital model of a room or other space (e.g., an indoor or outdoor space) and virtually furnishing the digital model with digital objects corresponding to real objects.

BACKGROUND

Furniture manufacturing, distribution and interior decorating are significant industries. While current systems allow users to view furniture and décor online, they generally do not permit users to quickly and easily understand whether a particular object (e.g., an item of furniture or décor) will fit within an intended space, for example, a particular room or other space (e.g., an indoor or outdoor space). Also, existing systems typically do not permit shoppers to visualize what the object being viewed would look like both dimensionally and aesthetically within the room or space without actually physically placing the item within that room or space.

SUMMARY

This specification describes systems and methods for generating a digital model of a space and modifying the digital model using a machine learning system. The machine learning system can be implemented as computer programs on one or more computers in one or more locations to generate the digital model from a three-dimensional (3D) scan of the space. Using the 3D scan, the machine learning system can also generate digital objects in the digital model representing real objects detected in the space. The systems and methods can also be used to virtually furnish the digital model with new digital objects based on user inputs through a user interface, as well as revise various features of the digital model such as the floor plan or wall color. Systems, methods, and devices for performing various other functions such as retrieving, transmitting, receiving and storing data processed by the machine learning system are also described.

The aspects disclosed herein result in digital modeling systems, devices, and methods that are capable of rapid and accurate spatial reasoning that are needed to generate photorealistic and interactive 3D spatial models that are currently unavailable. For example, although many industries have a need for object visualization tools that can faithfully reconstruct a room (or other space) to the room's physical dimensions, and position various objects in said room, existing systems lack such capabilities. For example, in addition to the furniture and décor industries, such systems, devices, and methods disclosed herein would also be useful in warehouse equipment and placement, construction placement, architecture, indoor and outdoor space optimization, mechanical engineering, photography and videography for framing of a scene, and in the fashion industry for the design of clothing and fashion accessories as well as comparisons of the same.

Accordingly, a need exists for systems, devices, and methods that can create a digital model (e.g., a 3D model) of an actual room or other space (e.g., an indoor or outdoor space) using dimensions that correspond to the scale of the dimensions of the room or space. Also, a need exists for systems, devices, and methods that allow for the dimensions of a room or other space to quickly and easily be measured and recorded. A further need exists for systems, devices, and methods that allow a digital model of the room or space to be virtually furnished with digital objects representing real objects (e.g., 3D representations). These digital objects can include items such as furniture and décor that match the appearance and dimensions of real items of furniture or décor. Yet further needs exist for systems, devices, and methods similar to the foregoing for use in industries and services related to furniture, home décor, interior design, warehouse equipment and placement, construction placement, architecture, space optimization, mechanical engineering, photography and videography, and fashion. Furthermore, the solutions described herein can be used in the context of creating an accurate inventory of items in a space, which can be later used to verify the previous existence of the items in the space after they are no longer present, e.g., after a catastrophic event such as a fire, flood, earthquake, hurricane, burglary, etc.

The solution that provides these capabilities should be implemented using technologies that enable these capabilities in the context of a user computing device such as a mobile device, a wearable device, a tablet, a laptop, a desktop, augmented reality (AR) glasses, virtual reality (VR) glasses, a gaming system, a digital assistant device, or another computing device that is configured for personal use. The techniques and combinations of technologies described throughout this specification enable user devices to provide these capabilities by generating 3D digital models using fewer computational resources than prior modeling techniques, as well as using optimized data transmission and/or streaming mechanisms for faster data transfer. The use of the techniques described herein also enables creation of the digital models in a shorter period of time than has been possible to date, irrespective of the computing resources available.

In one aspect, a system for generating a digital model of a space and modifying the digital model is described. The system includes one or more computers and one or more storage devices storing instructions that, when executed by the one or more computers, cause the one or more computers to perform operations including: obtaining a point cloud representation of the space, the point cloud including multiple points; segmenting the point cloud into: (i) an inlier point cloud including multiple inlier points, and (ii) an outlier point cloud including multiple outlier points, where the segmenting includes: identifying, as the inlier points, the points of the point cloud that have at least a specified likelihood of being measurements of any of multiple planes of the space; and identifying, as the outlier points, all other points of the point cloud that are not identified as the inlier points; processing the inlier point cloud to generate a segmented inlier point cloud that includes, for each measured plane of the space, a respective plane point cloud representing the plane; and processing, using a neural network, the outlier point cloud to generate a segmented outlier point cloud that includes, for each of one or more objects detected in the space, a respective object point cloud representing the object.

In some implementations, the plane point clouds representing the planes of the space classify each of the planes as a boundary of the space.

In some implementations, the object point clouds representing the one or more objects in the space classify each of the one or more objects as moveable within the space and removable from the space.

In some implementations, the operations further include generating a mesh model of the space that includes: generating, from the segmented inlier point cloud, multiple meshed planes of the mesh model representing the planes of the space; and generating, from the segmented outlier point cloud, one or more meshed objects in the mesh model representing the one or more objects in the space.

In some implementations, the operations further include: obtaining one or more images depicting the space; overlaying the one or more images onto the mesh model and the one or more meshed objects in the mesh model to generate: multiple digital planes of the digital model representing the planes of the space; and one or more digital objects in the digital model representing the one or more objects in the space; and providing the digital model including the one or more digital objects for presentation in a user interface on a user device.

In some implementations, the operations further include: receiving, through the user interface, a user input corresponding to a selection of one of the one or more digital objects in the digital model; and removing the selected digital object from the digital model presented in the user interface.

In some implementations, the operations further include: presenting, through the user interface, multiple new digital objects available to be added to the digital model; receiving, through the user interface, a user input corresponding to a selection of one of the new digital objects; and adding the selected new digital object to the digital model presented in the user interface.

In some implementations, the point cloud representation of the space and the one or more images depicting the space are obtained by the system through the user interface. In some implementations, the neural network is trained on multiple training examples that each include: (i) a respective input point cloud, and (ii) a corresponding target point cloud that includes, for each of one or more target objects, a respective object point cloud representing the target object, where training the neural network includes: processing, using the neural network, the respective input point cloud of each training example to generate a respective output point cloud that is an estimate of the corresponding target point cloud; determining gradients of an objective function that characterizes an error between the respective output and target point clouds of each training example; and using the gradients of the objective function to update a set of network parameters of the neural network.

In some implementations, the respective input and target point clouds of at least some of the training examples include noisy data.

In another aspect, a method performed by one or more computers for generating a digital model of a space and modifying the digital model is described. The method includes: obtaining a point cloud representation of the space, the point cloud including multiple points; segmenting the point cloud into: (i) an inlier point cloud including multiple inlier points, and (ii) an outlier point cloud including multiple outlier points, where the segmenting includes: identifying, as the inlier points, the points of the point cloud that have at least a specified likelihood of being measurements of any of multiple planes of the space; and identifying, as the outlier points, all other points of the point cloud that are not identified as the inlier points; processing the inlier point cloud to generate a segmented inlier point cloud that includes, for each measured plane of the space, a respective plane point cloud representing the plane; and processing, using a neural network, the outlier point cloud to generate a segmented outlier point cloud that includes, for each of one or more objects detected in the space, a respective object point cloud representing the object.

In some implementations, the plane point clouds representing the planes of the space classify each of the planes as a boundary of the space.

In some implementations, the object point clouds representing the one or more objects in the space classify each of the one or more objects as moveable within the space and removable from the space.

In some implementations, the method further includes generating a mesh model of the space that includes: generating, from the segmented inlier point cloud, multiple meshed planes of the mesh model representing the planes of the space; and generating, from the segmented outlier point cloud, one or more meshed objects in the mesh model representing the one or more objects in the space.

In some implementations, the method further includes: obtaining one or more images depicting the space; overlaying the one or more images onto the mesh model and the one or more meshed objects in the mesh model to generate: multiple digital planes of the digital model representing the planes of the space; and one or more digital objects in the digital model representing the one or more objects in the space; and providing the digital model including the one or more digital objects for presentation in a user interface on a user device.

In some implementations, the method further includes: receiving, through the user interface, a user input corresponding to a selection of one of the one or more digital objects in the digital model; and removing the selected digital object from the digital model presented in the user interface.

In some implementations, the method further includes: presenting, through the user interface, multiple new digital objects available to be added to the digital model; receiving, through the user interface, a user input corresponding to a selection of one of the new digital objects; and adding the selected new digital object to the digital model presented in the user interface.

In some implementations, the point cloud representation of the space and the one or more images depicting the space are obtained through the user interface.

In some implementations, the neural network is trained on multiple training examples that each include: (i) a respective input point cloud, and (ii) a corresponding target point cloud that includes, for each of one or more target objects, a respective object point cloud representing the target object, where training the neural network includes: processing, using the neural network, the respective input point cloud of each training example to generate a respective output point cloud that is an estimate of the corresponding target point cloud; determining gradients of an objective function that characterizes an error between the respective output and target point clouds of each training example; and using the gradients of the objective function to update a set of network parameters of the neural network.

In some implementations, the respective input and target point clouds of at least some of the training examples include noisy data.

Particular embodiments of the subject matter described in this specification can be implemented so as to realize one or more of the following advantages.

The systems and methods described herein generally include a machine learning system (e.g., including a neural network) that can efficiently process three-dimensional (3D) scans of indoor or outdoor spaces and generate interactive digital models of the spaces (e.g., visual model representations) that represent the physical dimensions of the spaces. Moreover, a digital model generated by the machine learning system can be viewed, using a user computing device, from any 3D perspective, e.g., by providing a camera view at any position and angle relative the digital model. This can be considerably valuable for object visualization and manipulation. For example, when adding, removing or positioning digital objects representing real objects (e.g., visual object representations) into the digital model, the physical dimensions of the real objects can be accurately represented by the digital objects in the digital model. This can allow a user to virtually furnish a digital model of a space, with digital objects scaled one-to-one to the dimensions of the space, and visualize the completed furnishing (or other object arrangement) from any perspective at the correct scale.

These digital models can be created in a shorter period of time and using less computational resources than would otherwise be necessary to create such models. For example, rather than taking weeks to create digital models, which was generally the case using prior technologies, the solutions described herein can capture spatial information and generate a usable model ready within minutes, if not faster. These speed advantages are realized, in part, by the manner in which information about the space is captured and processed, as well as the manner in which the captured information is transferred to the machine learning system, as discussed in more detail below. To be clear, the improvements provided by the subject matter discussed herein are not achieved because a computer is being used. Rather the techniques discussed herein are enabling one or more computers of the system to receive data and perform modeling operations on such data in a more efficient manner.

The systems and methods described herein can alleviate numerous frustrations related to virtual modeling applications, such as applications that assist home renovation and decoration. For example, the systems and methods eliminate the need for manual measurements of a space to be taken (e.g., tape measurements), as well as the need to build or physically place furniture or other objects in a space before a user is able to understand the aesthetics of such furniture or other objects in the context (e.g., size, shape, and visual characteristics) of the space. The systems and methods can also provide cost savings to retailers since showrooms can be scaled back in favor of digital renderings of the retailers' offerings (e.g., furniture or other items) that can be inserted into customers' digitally rendered spaces, rather than requiring a large stock of physical items at the showrooms. This will also result in fewer product returns due to the incompatibility of furniture or other items in a space only being determined after placing the physical object in the space.

Certain aspects of the machine learning system described in this specification are summarized below.

The machine learning system can analyze and process a 3D scan of a space that includes a point cloud representation of the space. The machine learning system can then generate an interactive digital model of the space, including digital objects representing the real-world objects detected in the space, from the processed point cloud. Since point clouds can be generated via time-of-flight (ToF) imaging devices (e.g., LIDAR, 3D scanners, and other detection, ranging and remote sensing devices), point clouds generally include distance or depth data characterizing the physical size and shape (i.e., dimensions) of a space and any objects present in the space. Hence, the machine learning system can scale the digital model and any digital objects in the digital model to the space's physical dimensions, without having to first generate a depth map (which slows down conventional systems), to more quickly generate the digital model and the digital objects.

The machine learning system can predict locations of space boundaries, such as walls, ceilings or sky, and/or floors or ground, that are occluded by objects in a physical space to provide a more complete representation of boundaries of the space than that provided by conventional systems. To achieve this, the machine learning system can semantically segment point clouds to isolate bounding planes of the space and detect any physical objects present in the space. The machine learning system can use the isolated planes to correct holes and gaps in point clouds, for example, corresponding to an incomplete scan of a floor, a ceiling, or a wall of a space, or due to transparent or reflective features such as windows and mirrors. The machine learning system can mesh point clouds to generate meshed models of a space and physical objects present in the space (e.g., polygon meshes and collision-based meshes). The machine learning system can also overlay images onto the mesh models to generate photorealistic digital models that take into account collisions (e.g., preventing digital objects from overlapping or passing through the digital model boundaries represented, for example, by the planes), among other functions.

The machine learning system is particularly adept at detecting objects in point clouds and semantically segmenting the objects, which has been a challenging problem in object visualization and manipulation. The problem is compounded when point clouds are low-quality, e.g., contain considerable noise, have a sparse number of points, or objects have incomplete surface characterizations (e.g., holes and gaps in the point cloud).

To address one or more of these issues, the machine learning system can train a neural network on a set of training examples including point clouds of objects that are commonly placed in spaces, e.g., chairs, tables, couches, beds, desks, lamps, plants, dressers, pictures, television sets, television stands, etc. The objects' point clouds can be generated by the machine learning system from 3D models of the objects (e.g., a catalogue of furniture) or provided to the machine learning system by a 3D capture device. The neural network can be trained by the machine learning system to detect the objects and classify the objects based on any desired classification, e.g., object types or properties of the objects. For example, the object properties can include that certain objects are moveable within a space and/or removable from the space. To simulate real-life point cloud gathering conditions (e.g., from a user device such as a smartphone or tablet), the machine learning system can inject noise into the object point clouds included in the training data sets or otherwise deteriorate the quality of the object point clouds, which can significantly improve object detection and segmentation on low-quality point clouds, thereby improving the ability of the machine learning system to identify a given object. Since point clouds gathered from user devices can be difficult to clean using a general purpose algorithm, injecting noise into training data sets can outperform such pre-processing techniques. Nevertheless, in some implementations, the machine learning system can implement pre-processing techniques to clean received point clouds (e.g., removing noise and artifacts) in order to effectively perform segmentation tasks.

The details of one or more embodiments of the subject matter of this specification are set forth in the accompanying drawings and the description below. Other features, aspects, and advantages of the subject matter will become apparent from the description, the drawings, and the claims.

Unless otherwise defined, all technical terms used herein have the same meaning as commonly understood by one of ordinary skill in the art to which this disclosure belongs. Although methods and materials similar or equivalent to those described herein can be used in the practice or testing of the present disclosure, suitable methods and materials are described below. All publications, patent applications, patents and other references mentioned herein are incorporated by reference in their entirety. In the case of conflict, the present specification, including definitions will control.

BRIEF DESCRIPTION OF THE DRAWINGS

Like reference numbers and designations in the various drawings indicate like elements. The components shown here, their connections and relationships, and their functions, are meant to be examples only, and are not meant to limit the implementations described and/or claimed in this document.

DETAILED DESCRIPTION

Figure 1:
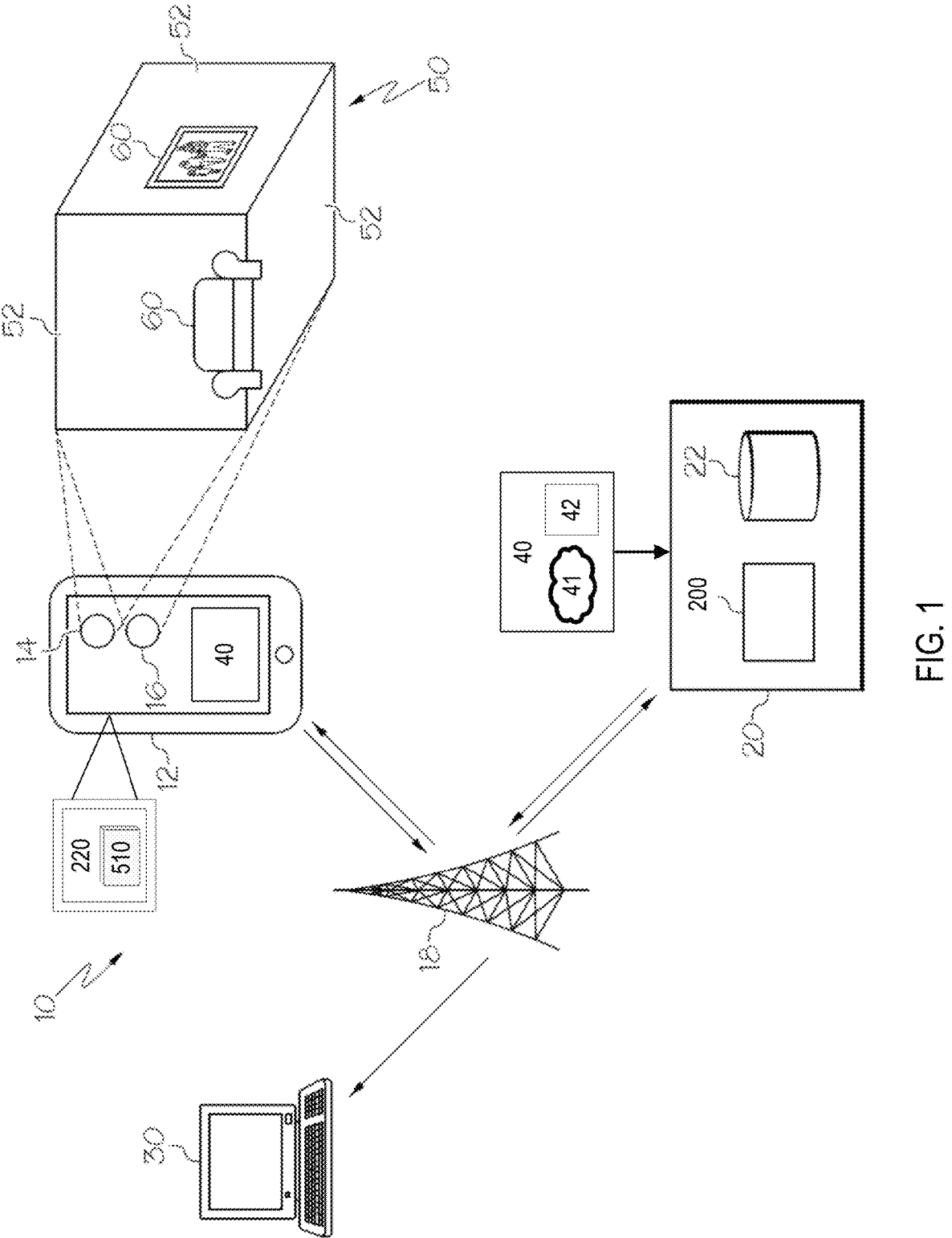
FIG. 1 is a schematic diagram of an example system for generating a digital model of a space and detecting any objects present therein.

The present disclosure is best understood by reference to the detailed drawings and description set forth herein. Example embodiments of the disclosure are discussed below with reference to the drawings; however, those skilled in the art will readily appreciate that the detailed description given herein with respect to these figures is for explanatory purposes as the disclosure extends beyond these limited embodiments and will only be limited by the appended claims. For example, in light of the teachings of the present disclosure, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the examples described in the disclosure may exist that are too numerous to be listed but that all fit within the scope of the present disclosure. Also, singular words should be read as plural and vice versa and masculine as feminine and vice versa, where appropriate, and alternative embodiments do not necessarily imply that the two are mutually exclusive.

The present disclosure should not be limited to the particular methodology, compounds, materials, manufacturing techniques, uses, and applications, described herein, as these may vary. The terminology used herein is used for the purpose of describing particular embodiments only, and is not intended to limit the scope of the present disclosure. As used herein and in the appended claims, the singular forms "a," "an," and "the" include the plural reference unless the context clearly dictates otherwise. Thus, for example, a reference to "an element" may be a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this specification, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide typical instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the embodiments of the disclosure, but instead as merely intended to highlight alternative or additional features that may or may not be utilized in a particular embodiment of the disclosure.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

As used herein, the term "computing device" generally refers to any device having a processor, memory, and a storage device that may execute instructions such as software. The term "computing device" includes, but is not limited to, a single personal computer, portable computer, laptop computer, virtual machine, virtual container, host, server, tablet computer, gaming device, wearable computing device, digital assistant device, and/or mobile device (e.g., a smartphone) or to multiple such devices working together to perform the function described as being performed on or by the computing device. Computing devices may include a network interface such as a card, chip, or chip set that allows for communication over a wired and/or wireless communications network. The computing devices may run an operating system.

As used herein, the term "processor" means processing devices, programs, circuits, components, systems, and subsystems, whether implemented in hardware, software or both, and whether or not programmable. The term "processor" includes, but is not limited to, one or more computing devices, hardwired circuits, signal modifying devices and systems, devices and machines for controlling systems, central processing units, programmable devices and systems, field programmable gate arrays, application specific integrated circuits, systems on a chip, systems composed of discrete elements and/or circuits, state machines, virtual machines, data processors, processing facilities, and combinations of any of the foregoing.

As used herein, the term "application" (also referred to herein as an "app") refers to one or more computing modules, programs, processes, workloads, threads, and/or a set of computing instructions executed by a computing device. Software modules, software objects, software instances, and/or other types of executable code provide several examples of applications.

As used herein, the term "data" includes entire computer readable files or portions of a computer readable file, whether permanent or temporary. The data may include or represent text, numbers, symbols, other indicia, data, images, photographs, graphics, animations, audio, video, multimedia, voice, computer programs, computer source code, computer object code, executable computer code, other information, and/or a combination of two or more of the foregoing.

Figure 2:
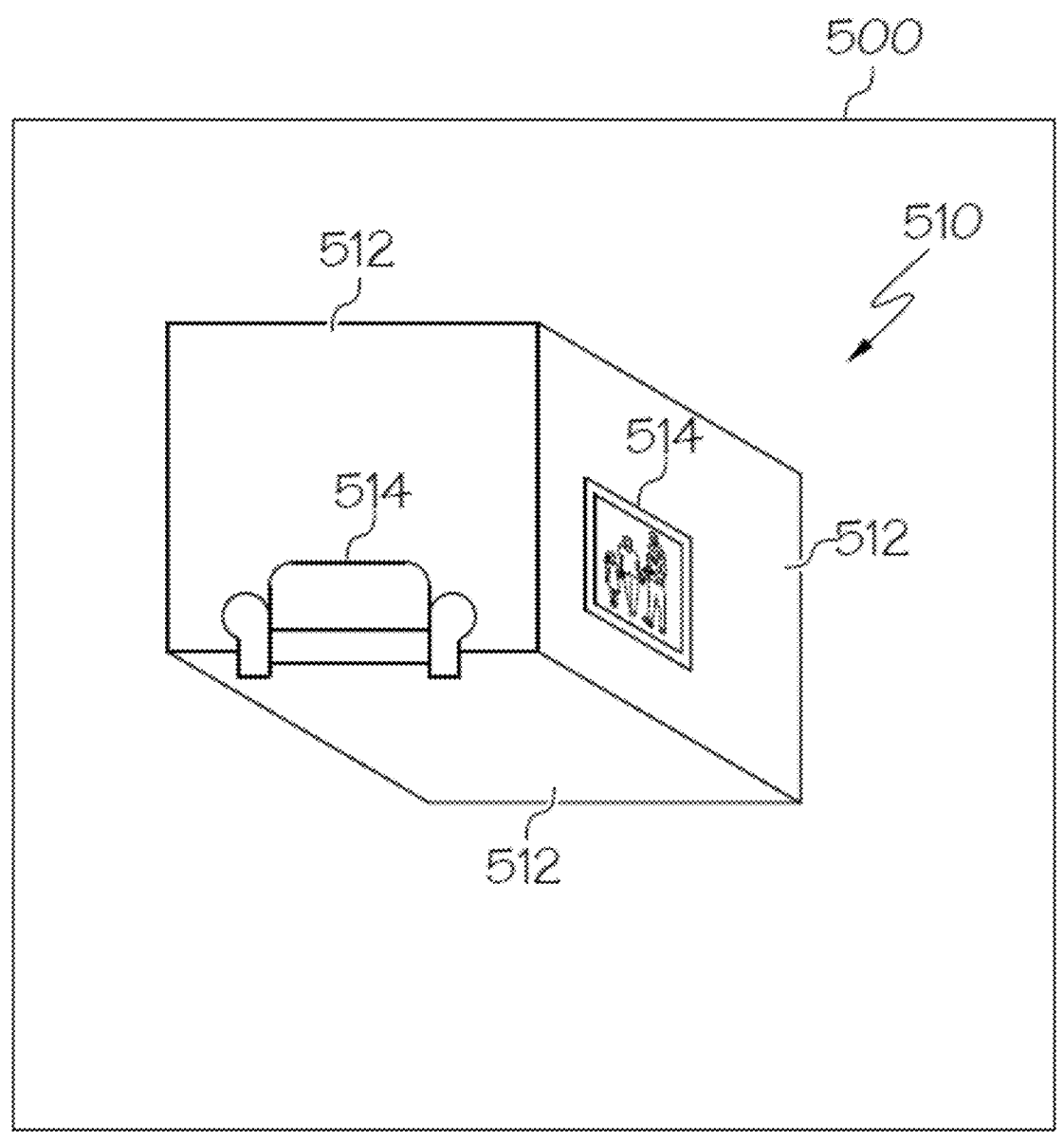
FIG. 2 is a perspective view of a digital model visually representing a space within a digital environment of a machine learning system.

FIGS. 1-6 show an example of a system 10 for generating a digital model 510 of an indoor space 50 and virtually furnishing the digital model 510. At a high level, the system 10 includes a user computing device 12 having a processor and associated memory, a three-dimensional (3D) capture system having a camera 14 and a remote sensing device 16, a communications network 18, a remote computing device 20, a database 22, a machine learning system 200, and a user interface 220. A perspective view of the digital model 510 representing the space 50 within a digital environment 500 of the machine learning system 200 is depicted in FIG. 2. The system 10 has the ability to process 3D scans of spaces collected from 3D capture systems of various user devices to generate dimensionally accurate digital models of the spaces with collision-based meshing through machine learning. For example, the user devices can include various smartphones utilizing one or more cameras and a lidar ("Light Detection and Ranging") device as a 3D capture system for collecting 3D scans characterizing the appearance, size, shape and physical dimensions of the indoor space 50 and any objects 60 present in the indoor space.

A 3D scan 40 of a space 50 generally includes a point cloud 41 representation of the space 50 and one or more images 42 depicting the space 50 from one or more vantage points. Depending on the 3D capture system used to obtain the scan 40 (as well as memory constraints), the point cloud 41 may include millions or more individual points. Each point corresponds to a respective coordinate (e.g., x, y, z) defined in any convenient coordinate system. Generally, the point cloud 41 includes dimensionally accurate data as 3D capture systems can use time-of-flight (ToF) measurements (or other means) to determine the relative distances between points. Moreover, the scan 40 may include hundreds or more individual images 42. The images 42 may also include image data (or capture data) such as a camera pose that can be used by the system 10 to determine the respective vantage point of each of the images 42 relative the coordinate system defining the points of the point cloud 41. This allows the system 10 to overlay the images 42 onto, for example, a mesh model of the point cloud 41 to generate a photorealistic digital model 510 of the indoor space 50, along with photorealistic digital objects 514 representing real objects 60.

The system 10 processes, enhances or otherwise modifies the 3D scan 40 to generate an interactive digital model 510 of the space 50 (e.g., a visual model representation) with a complete 3D camera range. The system 10 provides users with a unique experience for designing their room or other space 50 with full control and awareness of spatial reasoning. The system 10 is useful for measuring dimensions (e.g., length, width, and height) of a room 50 or another indoor space 50 and creating a digital model 510 of the room or other indoor space. For convenience and not for purposes of introducing any limitation on the scope of the present disclosure, unless specified otherwise and except where context clearly requires a different interpretation, the term "room" as used herein shall mean a room, a portion of a room, another indoor space, or a portion of an indoor space, and in all cases refers to a real room or space. In some cases, a space may refer to an outdoor space, e.g., a patio, a fenced backyard, a gazebo, etc. In the absence of a ceiling plane, system 10 can automatically generate an artificial plane (e.g., a sky plane) for the digital model 510 at a pre-defined threshold height, or based on other analysis of the space being captured (e.g., a height of a bounding wall of the space). Descriptions throughout this document that refer to a room, are also applicable to outdoor spaces, such that the reference to a room in a description does not limit that description to an indoor space.

The digital model 510 generated by the system 10 is a digitally interactive and accurate dimensional model. In one example, a machine learning system 200 of the system 10 analyzes the dimensions of the room 50, isolates the walls, floor, and ceiling planes, and creates a collision mesh to ensure that one or more digital objects 514, which correspond to real objects 60 (e.g., furniture and décor items) within the room 50, are defined and confined to a certain area or location within the digital model 510 that corresponds to the area or location of each digital object's corresponding real object within the room 50. The collision mesh is also referred to as a collision model and is used to model interactions and collisions of 3D bodies or objects 60 such as furniture, décor, architectural and structural elements 52 such as walls, floors, ceilings or other planes of the room 50.

In some implementations, the user computing device 12 is a smartphone. In other implementations, the user device 12 can be a tablet computer or other handheld or mobile computing device having a processor and associated memory. In still other implementations, the user computing device 12 can be a personal computer such as a laptop computer or a desktop computer. In some implementations, the camera 14 is an integrated camera that is a component of the user computing device 12, e.g., an integrated camera of a smartphone or tablet computer. In other implementations, the camera 14 may be a separate component of the system 10 that has a wired or wireless connection to the user computing device 12.

The communications network 18 can receive and transmit data to and from various components of the system 10. The communications network 18 is the Internet in some implementations. In other implementations, the communications network 18 can be a local area network (LAN), a wide area network (WAN), a virtual private network (VPN), a wireless radio network (i.e., a cellular telephone communications network), a computer network, or any other suitable communications network capable of receiving and transmitting data. In particular, the communications network 18 can transmit the 3D scan 40 to the remote computing device 20 from the user computing device 12. The communications network 18 may also transmit the digital model 510 (e.g., data defining the digital model) from the remote computing device 20 to the user device 12.

For example, a user can upload the 3D scan 40 through the user interface 220, accessible on the user device 12, which is transmitted to the remote computing device 20 by the communications network 18 using a streaming transfer service (or streaming mechanism). In some implementations, the streaming transfer service implements data chunking techniques to bifurcate the 3D scan 40 into multiple "chunks" that provide more manageable pieces of information. In particular, the chunks can be transmitted from the user device 12 and received by the remote device 20 independently from one another which can facilitate significantly higher streaming rates and/or compression rates. The chunks can then be reassembled at the remote device 20 to obtain the 3D scan 40. In conjunction with other aspects of the system 10, data chunking allows the remote computing device 20 to receive and process a 3D scan 40 in a manner of minutes, as opposed to days or weeks. In some implementations, to perform data chunking, the streaming transfer service implements chunked transfer encoding available in Hypertext Transfer Protocol (HTTP) version 1.1, defined in RFC 9112 § 7.1. In other implementations, the streaming transfer service uses other data encoding and streaming techniques available, for example, in HTTP/2.

The remote computing device 20 is a computer (or multiple computers), having a processor and associated memory, which is generally in a different location than the location of the user computing device 12. The remote computing device 20 can be a server or more than one server. In some implementations, the database 22 is stored, at least in part, on the remote computing device 20. In some implementations, the database 22 may also be stored in whole or in part on the user computing device 12. A 3D scan 40 including images 42 and a point cloud 41 obtained from the camera 14 and the remote sensing device 16 can be stored in the database 22.

The database 22 (or a different database) generally includes at least one object file, which includes object data related to a real object for positioning a digital object (e.g., a visual object representation) corresponding to the real object's shape and dimensions in the digital model 510. Object files can be associated with a variety of real objects. For example, object files can be associated with different objects than those detected in the space 50. Object files can also be associated with similar objects to those detected in the space 50, e.g., corresponding to a same object type (e.g., chairs) or having similar properties (e.g., placeable on tables). As shown in FIG. 1, the real object 60 can be, for example, an item of furniture or an item of home décor, e.g., a vase, a lamp, a light fixture, an appliance, a television, a speaker, or other electronic device, a rug, a framed picture, and other home goods or accessories. The digital object visually represents the real object 60 in the digital model 510.

The user computing device 12 receives the 3D scan 40 captured by the camera 14 and the remote sensing device 16, and transmits said scan 40 via the communications network 18 to the remote computing device 20. As mentioned above, the user device 12 can use the user interface 220, such as provided by a mobile application, to stream the 3D scan 40 to the remote computing device 20 to be processed. The user computing device 12 and the user interface 220 are generally used by a user (a person), for example, a customer seeking to furnish a room 50. However, automated systems for obtaining and transmitting 3D scans to the remote computing device 20 can also be implemented.

The remote sensing device 16 measures the spatial dimensions of the room 50 (e.g., length, width, and height) by generating a point cloud 41 of the room 50. The spatial dimensions of the room 50 can be determined by the system 10 from the points of the point cloud 41 associated with the room's structural elements 52. For example, as is described below, the machine learning system 200 can segment the point cloud 41 to generate respective plane point clouds representing the structural elements 52. The remote sensing device 16 also measures the spatial dimensions of any objects 60 present within the room 50, e.g., items of furniture and décor. The spatial dimensions of the objects 60 can be determined by the system 10 from the points of the point cloud 41 associated with the objects 60. For example, analogous to the structural elements 52, the machine learning system 200 can segment the point cloud 41 to generate respective object point clouds representing the objects 60. The remote sensing device 16 can be communicatively connected to the user computing device 12 via the communications network 18. In some implementations, the remote sensing device 16 is an integrated component of the user computing device 12, but in other implementations, the remote sensing device 16 can be a separate component of the system 10 that has a wired or wireless connection to the user computing device 12.

In some implementations of the system 10, the remote sensing device 16 is a light detection and ranging device (lidar device; also known as Lidar or LIDAR device). The lidar device 16 includes one or more lasers that measure the length of time required for light emitted by the one or more lasers to reflect back to the lidar device, i.e., time-of-flight (ToF) measurements. Using the foregoing lidar data, the lidar device 16 (or the user computing device 12, the remote computing device 20, or a combination of two or more of the foregoing) can generate the point cloud 41 used by the system 10 to create the digital model 510 of the room 50. For example, the lidar device 16 can determine the distance or depth to a point of a structural element 52 of the room 50, or an object 60 in the room 50, based on the measured time-of-flight of light. This allows the system 10 to infer the dimensions of the room 50 and objects 60 present in the room 50 directly from the point cloud 41, rather than having to separately generate a depth map (e.g., by processing the images 42). By measuring multiple points (e.g., thousands, tens of thousands, hundreds of thousands, millions, or more points), the lidar device 16 can generate the point cloud 41 that provides a point set surface characterization of the room 50 and any objects 60 present in the room 50. In many implementations, the lidar device 16 is an integrated component of the user device 12. However, in alternate implementations, the lidar device 16 can be a separate component of the system 10 that has a wired or wireless connection to the user computing device 12.

The remote sensing device 16 and the camera 14 scan the room 50 to obtain the 3D scan 40 that the system 10 uses to generate the interactive digital model 510 of the room 50. In some implementations, the system 10 analyzes at least one of the images 42 of the room 50 captured by the camera 14 as well the point cloud 41 obtained by the remote sensing device 16 to characterize the dimensions of the room 50. For example, the images 42 may include image data (or capture data) obtained from image processing or image capture on the user device 12 that can determine the dimensions of one or more elements of the room 50, e.g., the structural elements 52.

The system's machine learning system 200 analyzes and processes the 3D scan 40 to create the digital model 510 of the room 50. The machine learning system 200 determines the dimensions of the room 50 using the 3D scan 40, isolates the walls, floor, and ceiling planes of the room, and creates a collision-based mesh to ensure objects (including static structural elements of the room as well as movable objects within the room) are confined. In this way, other digital objects placed into the digital model 510 cannot pass through or overlap space occupied by such objects. Although the machine learning system 200 may utilize image or capture data from the images 42 as dimensional data to create the digital model 510, in many implementations, the machine learning system 200 uses the point cloud 41 data (e.g., lidar data) to model the dimensions and shapes of the room and objects within the room. For example, iOS 3D point cloud data provided by the lidar sensor 16 of the user computing device 12 (e.g., an Apple iOS smartphone) can be used as the 3D scan 40 that is received and processed by the system's machine learning system 200. This point cloud 41 data can be captured by the user computing device 12 using the "point-and-shoot" method that will be familiar to users of smartphones and tablet computers who use a similar method to take photographs using their mobile devices.

The machine learning system 200 analyzes and processes the 3D scan 40 to render in a format that is displayable in a web browser, the user interface 220, or other software application using 2D and 3D graphics rendering software (e.g., Unity or WebGL). The digital model 510 is viewable, e.g., as a visual model representation, on a display that is connected to a computing device. The display can be, for example, a computer monitor that has a wired or wireless connection to the user computing device 12, to the remote computing device 20, or to another computing device. In some implementations, the display can be an integrated display of the user device 12, e.g., a touch screen of a smartphone. The digital model 510 generally includes a visual scale, e.g., as represented in a visual model representation, that corresponds to the spatial dimensions of the room 50. The digital model 510 may be manipulated by a user through the user interface 220 using a pointing device (e.g., a computer mouse), gestures on a touch screen, or other interactive method. For example, the digital model 510 may be rotated 360 degrees or tilted at various angles and in various directions to provide views of the digital model 510 on the display from different vantage points relative to the user. In this way, the user can visualize the actual room 50 from different vantage points by visually referring to the digital model 510. The machine learning system 200 or another process of the system 10 may also include features that allow other modifications to the digital model 510 such as, for example, changes to flooring, wall coverings, lighting fixtures, appliances, window treatments, doors, entryways, window types, baseboards, crown molding, chair rail, paneling, wainscoting, ceiling types, ceiling coffering, and colors or textures of any of the foregoing. The machine learning system 200 or another process of the system 10 may also include features that allow modifications to "structural" elements 512 (e.g., digital planes) of the digital model 510 such as, for example, the addition, removal, or movement of walls, doors, entryways, and windows. For example, the user interface 220 can be configured to receive user inputs to adjust a location (e.g., coordinates) of a plane defining a boundary of the space 50 represented by digital model 510. The machine learning system 200 or another process of the system 10 may also include features that allow modifications to lighting direction, color, and intensity in the digital model to simulate actual lighting conditions in the room.

The digital model 510 is three-dimensional (3D) as displayed on a display in a web browser, user interface 220 or other software application and is dimensionally accurate to scale relative to the room 50. The system 10 allows for depth to be simulated in the digital model 510 that is displayed to the user so that a more realistic and dimensionally accurate representation of the actual room 50 is provided. Once created, the digital model 510 may be stored on a computing device, e.g., on the remote computing device 20, in the database 22, or on the user computing device 12, for later retrieval for viewing, editing, adding visual object representations, and sharing.

The user interface 220 can be used by a user to position a new digital object selected from the database 22 into the digital model 510. For example, multiple new digital objects can be presented in the user interface 220 as available to be added and positioned in the digital model 510. Digital objects may be created as visual object representations of real objects such as, e.g., furniture, appliances, electronics, and items of home décor. These digital objects may be created by the machine learning system 200 using point cloud 41 data, meshed models, or combinations thereof. Each digital object may be dimensionally accurate to scale relative to the actual object it visually represents. The digital objects can be stored on a computing device, e.g., on the remote computing device 20, the user computing device 12, or the database 22, in the form of object files for later retrieval for viewing and editing. The digital objects 514 may be moved around by a user within the digital model 510 for placement in different locations or points within the digital model 510. The collision meshing used to create the digital model 510 prevents the digital objects 514 from passing through or overlapping space within the digital model 510 that is occupied by static structural elements, architectural elements, items of décor and other objects that may be present in the actual room and that are digitally represented by other digital objects in the digital model 510. In some implementations, the digital model 510 and each of the digital objects 514 includes a respective bounding box which can be used in combination or in place of the collisional meshing to define the limits of the digital room 510 and the digital objects 514. In some implementations, the collisional meshing and/or bounding boxes can facilitate latching mechanisms of the digital objects 514 to the structural elements 512 of the digital model 510. For example, if a digital object 514 is being moved (e.g., based on a user input) in a horizontal direction along a floor plane of the digital model 510, the collisional meshing can detect a collision with a wall plane and halt movement of the digital object 514 in that direction. The collisional meshing can then latch the digital object 514 to the wall and may continue movement in a vertical direction up the wall if such movement is considered allowable by the collisional meshing (e.g., based on the type of digital object). The user interface 220 may also allow removal, deletion, or replacement of digital objects corresponding to furniture and other objects in the room that are present when the 3D scan is initially captured and added to the initial digital model 510 created by the machine learning system 200.

Figure 3:
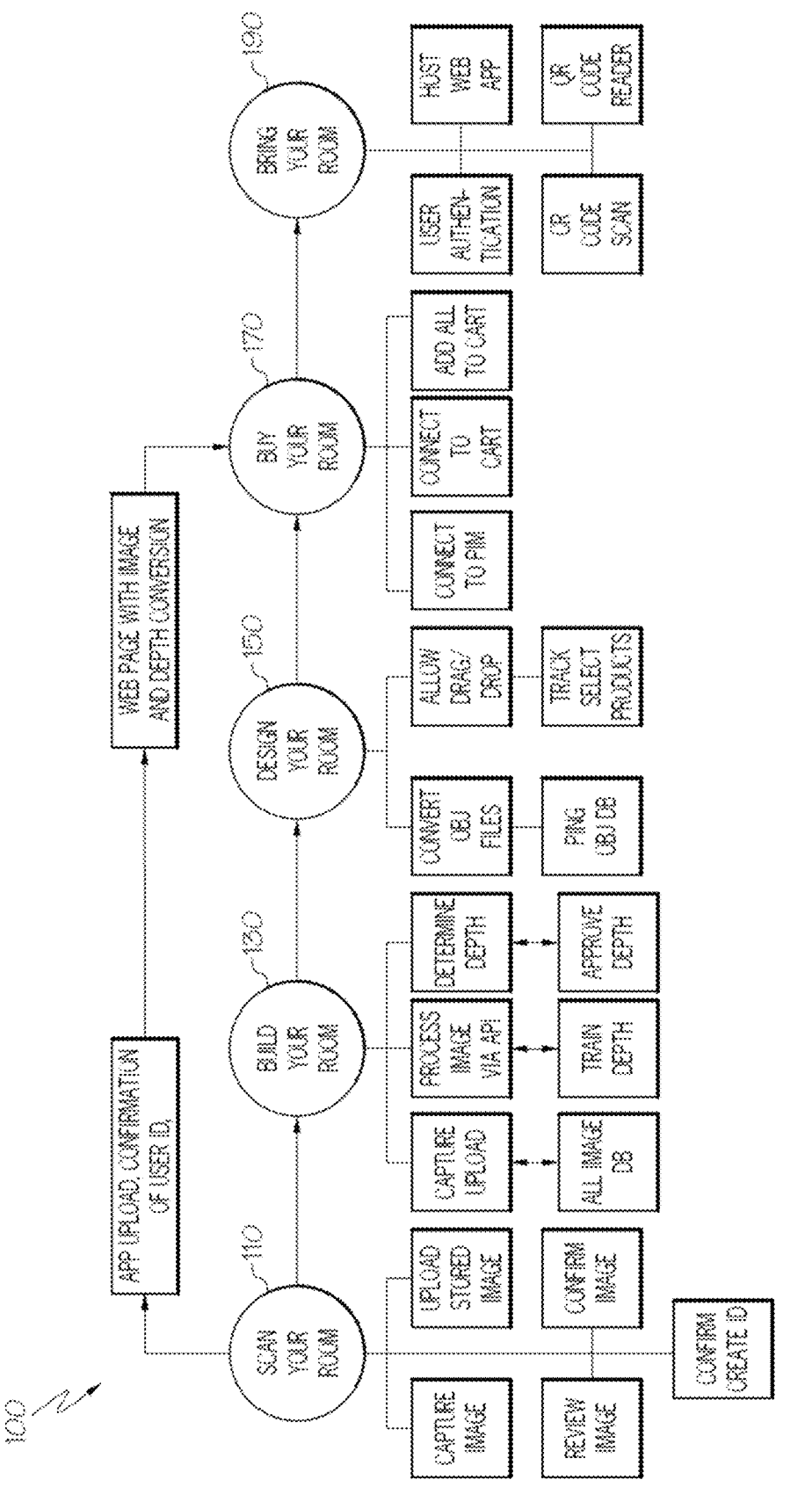
FIG. 3 is a flow chart showing various steps of an example method for generating and modifying a digital model of a space.

The system 10 can further include a digital shopping cart containing one or more digital models representing the room 50, to which digital objects representing various objects (e.g., items of furniture and home décor) have been added. As shown in FIG. 3, a user (e.g., the owner of the user computing device 12 or the owner or tenant of the room 50) may use the digital shopping cart to purchase all or some of the objects represented by the digital objects appearing in these "pre-designed" digital models. The system 10 can also include the ability to purchase actual items of furniture, home décor, home goods, accessories, etc., from among the digital equivalents that the user places into these pre-designed digital models.

The digital shopping cart is accessible via the user interface 220 or a software application (i.e., an "app") downloaded and installed or otherwise installed on the user computing device 12 or via non-downloadable software that is accessible via the communications network 18 on the user computing device 12 using a web browser or other software application.

FIG. 3 relates to a method 100 for creating a digital model of a room or other space (indoor or outdoor) and virtually furnishing the digital model, or otherwise populating the digital model with digital objects. The method 100 can be performed using systems such as those described elsewhere herein. Examples of the method 100 include the general steps of scanning a room 110, building a digital model of the room 130, and designing (e.g., populating) the digital model 150 by adding digital objects corresponding to (e.g., digitally representing) actual objects 60. The method 100 can further include a step of purchasing one or more of the actual objects represented by the digital objects added to the digital model during the design step 170. The method 100 can further include a step of scheduling delivery of the purchased items 190.

As explained above, in one step 110 of the method 100, a user scans a room 50 using a user computing device 12 in the manner described for the systems above. A 3D scan is captured and the user may be given an opportunity to review an image of the room captured by a camera of the user computing device to confirm that the image meets the user's requirements for the room or space within the room that the user wishes to use as the digital model 510 for virtual furnishing in order to view how the room 50 would appear with different furniture and other objects. The user may also be given an option to create a user account. In some implementations, the user may use the system as a guest.

In a next step 130 of the method 100, as described above, the system builds a digital model 510 of the room 50 using the 3D scan, which is analyzed and processed by a machine learning system of the system to generate the digital model 510.

In a next step 150 of the method 100, as described above, one or more digital objects representing furniture and other objects may be added to the digital model 510. These digital objects may correspond to the appearance, size and shape (to scale) of real items of furniture and other objects that the user may wish to purchase to furnish or decorate the room. The user may add and remove digital objects to the digital model 510 to view on a display connected to a computing device so that the user may determine how real items of furniture and décor corresponding to those represented by the added digital objects would look if placed within the room 50.

In another step 170 of the method 100, the user may purchase one or more of the real items of furniture and décor corresponding to those represented by the digital objects added to the digital model 510. This step may be accomplished by adding such items to a digital shopping cart to place an order for the items and to complete a purchase of them. In some implementations, the step 170 includes the option of identifying all the new digital objects added to the digital model 510 and adding all such digital objects to the digital shopping cart, facilitating seamless transition from designing to purchasing of furniture, appliances, and other home décor.

In some implementations, the step 170 includes the option of downloading (e.g., through the user interface 220) a QR code or other identifying code representing the digital model 510 and any modifications applied to the digital model 510 during step 150 (e.g., any added and/or removed digital objects). The QR code or other identifying code can be stored in a digital wallet of the user device 12 and can be brought to a retailer's store location and/or used as a save state of the digital model. This can allow a user (e.g., a customer) to consult with an associate at the retailer about their design before purchasing. For example, the associate can scan the QR code or other identifying code (e.g., on their smartphone or tablet) and generate a visual representation using Unity, WebGL, or other appropriate software, to see a digital model of the user's room and furnishings the user has created. The associate can then suggest modifications to the digital model and provide a unique purchasing experience for the user.

In another step 190 of the method 100, the user may schedule delivery of the purchased items. The seller or a shipping or fulfillment agent may use QR codes, bar codes, or other identifying codes or text to identify each purchased item and may use a QR code reader, bar code reader, or other device capable of reading other identifying codes or text to ensure that the correct purchased items are shipped or delivered to the user.

Machine Learning System

Figure 4:
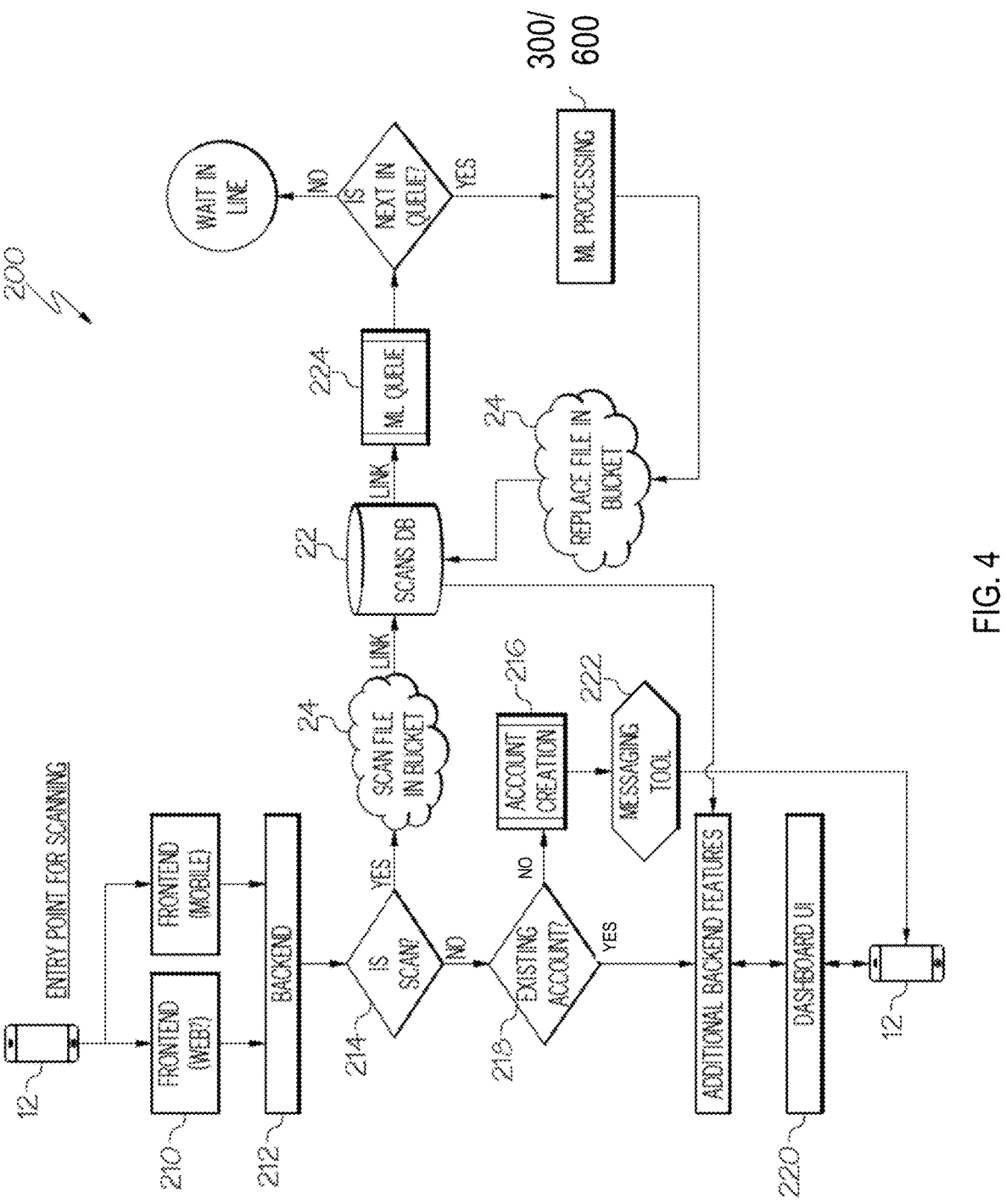
FIG. 4 is a flow chart showing various processes of an example system for generating a digital model of a space and detecting any objects present therein.
Figure 5:
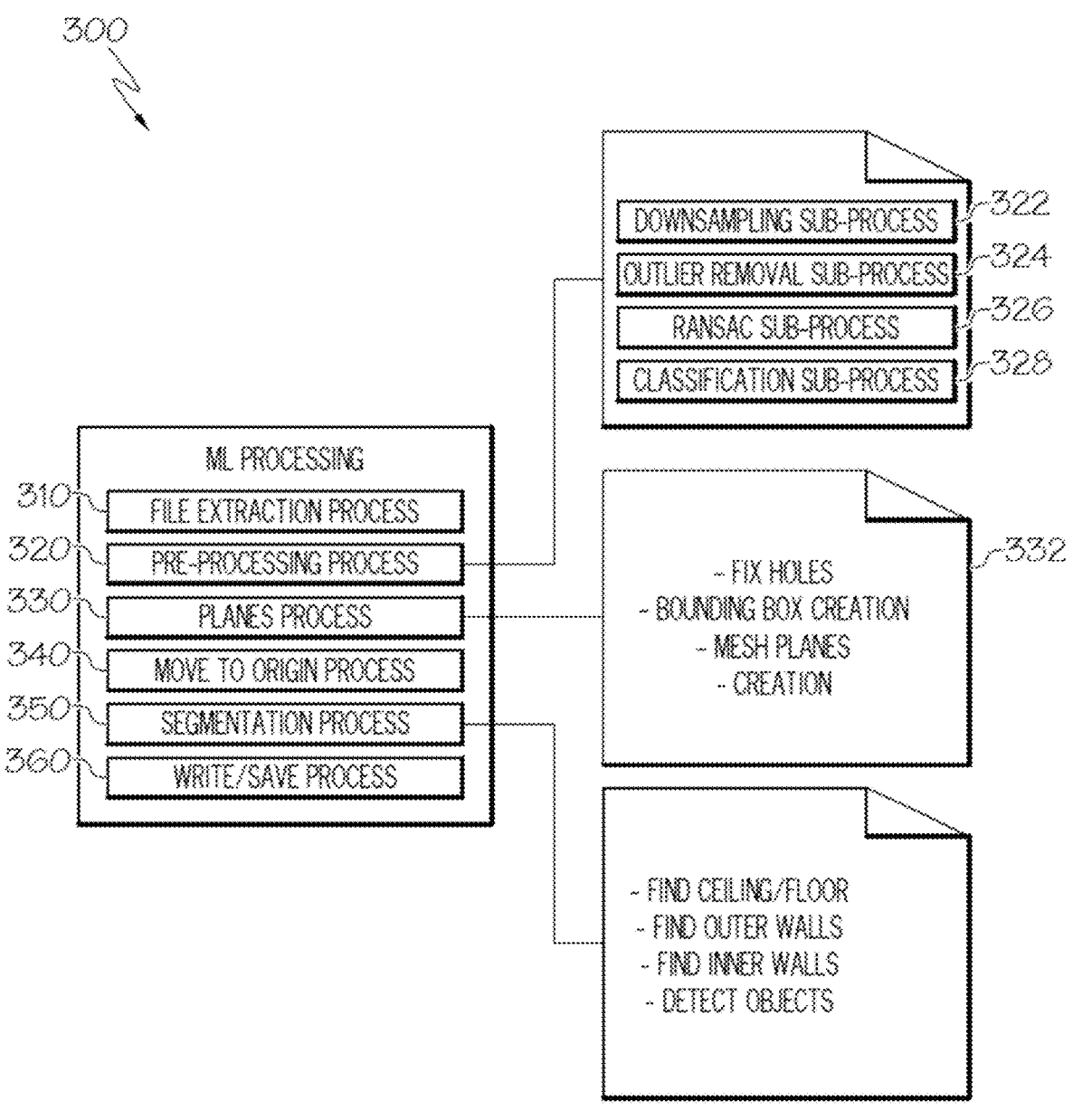
FIGS. 5 and 6 are schematic diagrams showing various example processes of a machine learning system.
Figure 6:
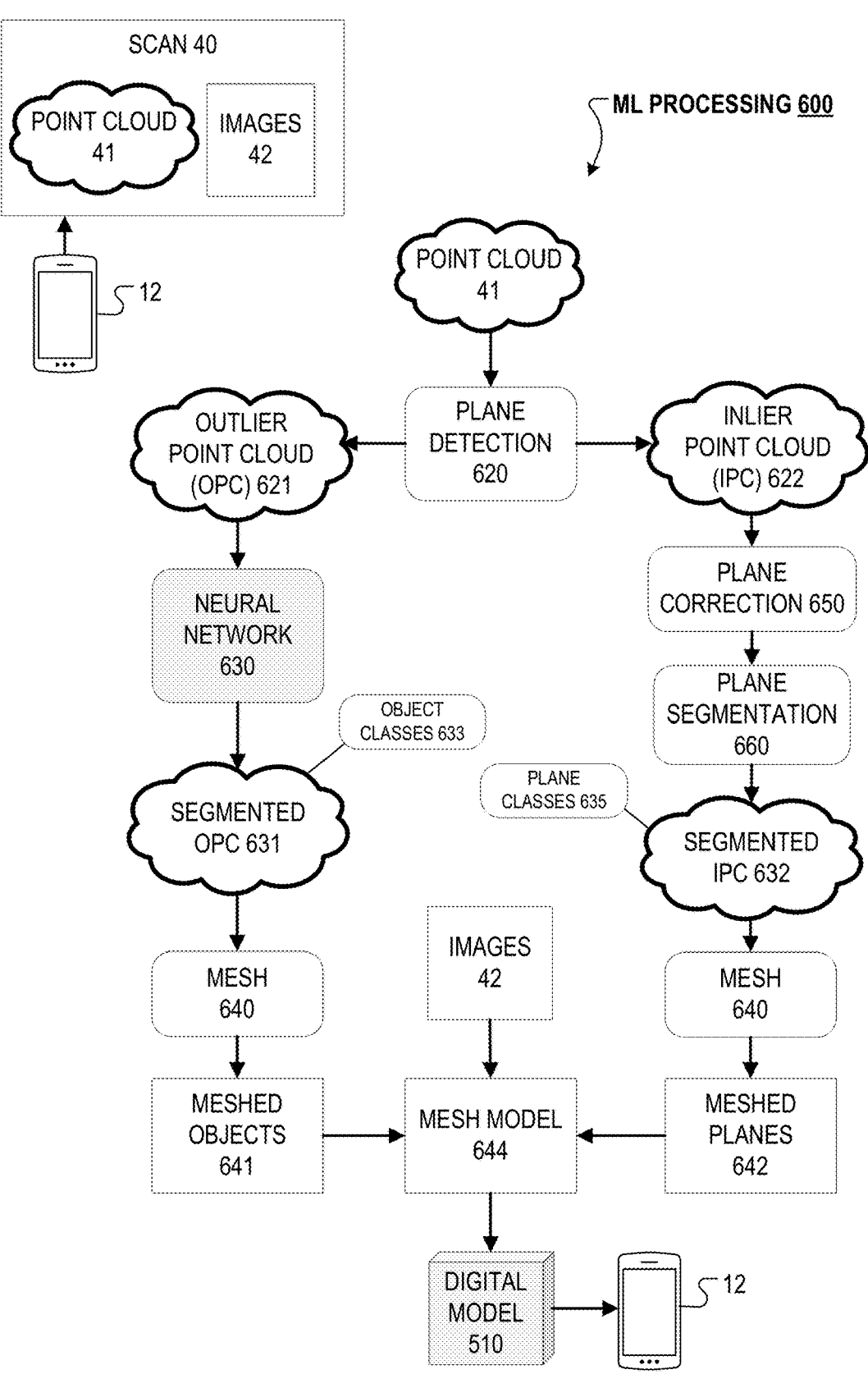

FIGS. 4-6 relate to a machine learning system 200 for processing a 3D scan 40 to create a digital model 510 of the indoor space 50 and one or more digital objects 514 in the digital model 510. The machine learning system 200 is included in some examples of the system 10 for creating the digital model 510 of the indoor space 50. The machine learning system 200 may also remove digital objects 514 corresponding to real objects 60 detected in the indoor space 50 when it is scanned by a 3D capture system. The machine learning system 200 may also add digital objects 514 to the digital model 510 to virtually furnish the digital model 510 as described elsewhere herein above. The digital object, which can be a digital image of a real object (e.g., a visual object representation of an item of furniture or home décor), is three-dimensional (3D) in visually representing the real object. The digital object is digitally manipulatable within the environment of the digital model 510 of the indoor space 50. For example, control features of the system may be operated to place the digital object at a particular location within the digital model 510. Other control features of the system may be operated to manipulate and control the orientation of the digital object on a display screen based on adjustments to coordinates on x, y, and z axes within the digital model 510 of the indoor space 50. The digital object may be moved, rotated, or both on any of those axes. As one example, a digital object representing a real sofa may be moved from a first position to a second position on or within the digital model 510, e.g., from a position against one wall to against another wall in the digital model. As another example, a digital object representing a real table having a rectangular top may be rotated about a vertical (e.g., z) axis on or within the digital model 510 so that its orientation is changed relative to fixed positions of walls or other visual object representations on or within the digital model 510. Such virtual rotation mimics the orientation of the real table on a horizontal plane within the real indoor space modeled by the digital model.

Referring to FIG. 4, a user (e.g., a customer seeking to purchase new furniture or home décor) can scan the user's room 50 using the user's computing device 12, which in some cases will be the user's smartphone. The room 50 can be any indoor space including, but not limited to, a living room, a dining room, a kitchen, a bedroom, a media room, a bathroom, a laundry room, an office, a conference room, a classroom, a lobby, or any other room in a house or building. In some uses, the indoor space 50 is an interior of a warehouse. In some implementations, the machine learning system 200 may also be used to process a covered outdoor space such as a porch, a balcony or veranda, or gazebo for which furniture or décor is desired; such covered outdoor space preferably includes at least one wall, a floor, and a ceiling. As noted above, the machine learning system may also be used to process an uncovered outdoor space, and use a bounding plane that is a specified distance from the ground as a top plane corresponding to the sky.

The user may scan the room "as is" without removing any furniture or other objects. A frontend 210 of the machine learning system 200, which allows the user to upload a 3D scan of the indoor space, is accessed on the user's computing device using a user interface 220 such as an app or a website having non-downloadable software that is accessed via a browser installed on the computing device. Scanning the room can include scanning the room with a lidar device 16 or other remote sensing device 16 of the user device 12. In some implementations, scanning includes both photographing and scanning the room with a camera 14 and a lidar device 16 of the user device 12 from which a point cloud and images are obtained and/or created.

The 3D scan collected by the user's computing device 12 is transmitted via a communications network 18 (e.g., the Internet or cellular network) to a remote server 20 that includes backend processing 212 of such data. As mentioned above, the 3D scan can be transmitted with streaming mechanisms such as chunked data encoding. The backend processing 212 can include a scan determination process 214 that analyzes the 3D scan received from the user computing device 12 to detect whether the 3D scan is scanned data of a space or other data. If the 3D scan is not scanned data of a space, the user may receive a prompt on the user interface 220. Such prompt can be, for example, to create a new account 216, to log into an existing account 218, to make a payment, a reminder of items added to an electronic shopping cart, or other similar electronic prompts that are displayed or otherwise communicated by the computing device to the user. The user interface 220 may be accessible through the user's computing device 12 via the app or website or on another computing device (e.g., a computing device at a furniture retailer's store or on an interior designer's computer). Similar to implementations allowing access on the user's computing device 12, the user interface 220 may be accessed on another computing device 30 via an application (e.g., an application installed on a personal, laptop, or tablet computer) or a website as non-downloadable software.

In some implementations, the system 200 may include a messaging tool or program 222 having messaging (e.g., instant message, SMS, or MMS) capabilities.

If the backend processing 212 performed by the system 200 detects that the 3D scan received by the remote server for backend processing is scanned data, the scanned data (e.g., a point cloud collected by a lidar device 16) is transmitted to a database 22. In some implementations, such data may be transmitted first to a digital bucket 24 for receiving scanned data and then from the digital bucket to a database 22 in which scanned data is stored. A digital bucket is a type of cloud-based object storage database, e.g., the cloud-based online storage buckets provided by Amazon Web Services under its Amazon S3 services.

The machine learning system 200 can include a machine learning queue 224 (e.g., a digital bucket or other application or database) in which new 3D scans received from a user's computing device 12 is placed in queue for processing by machine learning processes 300 or 600 for generating the digital model. In some implementations, the 3D scan is transmitted from the database 22 to the machine learning queue 224. The database 22 may include an application that pushes 3D scans to the machine learning queue 224, or the machine learning queue can include an application that pulls (or polls) 3D scans from the database into the machine learning queue. The machine learning queue 224 is used to prioritize and to increase the efficiency and speed of processing of the 3D scan especially in cases in which 3D scans are received from multiple users of the system simultaneously or near simultaneously. The processing of the 3D scan may be prioritized by processing the 3D scan based on time of receipt by the remote server or in the database in which scanned data is stored. If a 3D scan is not next in the queue based on such time considerations, the 3D scan will wait in line in the machine learning queue until no other 3D scans from other users is ahead of it in terms of time of receipt, at which time the 3D scan will be processed by the sub-processes of the machine learning system to create a digital model of the space.

If the 3D scan is the only 3D scan in the machine learning queue, or if the 3D scan of a user is first in line of priority for processing based on time considerations described above, the machine learning system will commence machine learning processing of the 3D scan to create a digital model of the space. Such machine learning processing may also include additional processing to remove objects detected in the 3D scan that do not correspond to structural elements of the digital model or to create digital objects representing objects detected in the 3D scan for placement and display in the digital model. The machine learning sub-processes are described elsewhere herein.

After the machine learning processes 300 or 600 and their sub-processes have created the digital model 510, the write/save process 360 will write and save the digital model to a database 22. In one example, the write/save process 360 first writes and saves the digital model 510 to a digital bucket 24, and from the digital bucket, the digital model is saved in a database 22. This database 22 can be the same database in which the original scanned data received by the remote computing device 20 was saved or a different database.

Before the digital model 510 is made available for viewing by the user, additional backend processing may be performed. As an example, digital objects representing real furniture or home décor items selected by the user or by a merchant or interior designer may be added to the digital model so that, when viewed in the user interface on a display, the digital model 510 provides the user with an accurate visual representation of how the indoor space 50 would appear if the actual, real furniture or home décor items were placed into the indoor space.

An object detected as being present in the indoor space 50 during scanning is a real object 60 (e.g., furniture or other object) that is not a structural element 52 of the indoor space, which is present and detected in the indoor space when the data is collected by the at least one data collection device. The system may be used to create a visual object representation that is or includes a digital object having characteristics that correspond to characteristics of the real object. Such characteristics shared between the real object and the visual object representation can include scaled dimensions, shape, and color.

The machine learning system 200 utilizes several machine learning processes that function in a series of steps to process a 3D scan. FIGS. 5 and 6 show two implementations of machine learning processes 300 and 600, respectively, which can be utilized by the machine learning system 200 separately or in combination to process a 3D scan.

As shown in FIG. 5, the machine learning processes 300 of the machine learning system 200 include a file extraction process 310, a pre-processing process 320, a process 330 for processing planes (hereafter, "the planes process"), a "move to origin" ("MTO") process 340, a process 350 for segmenting digital objects representing real indoor objects 60 from structural elements 512 of the digital model 510 (hereafter, "the segmentation process"), and a write/save process 360 for writing and saving files into a database 22 or into a digital bucket 24.

The file extraction process 310 of the machine learning system extracts data from a 3D scan captured by the remote sensing device and other instruments of the user computing device such as, for example, from the camera of the user device. For example, the file extraction process 310 may extract certain data (i.e., image data, lidar point cloud data, 3D mesh data, dimensional data, or other data types obtained from scanning or photographing a room using instruments such as the camera or lidar device of the computing device) from the 3D scan. The file extraction process 310 obtains the data from the database for further processing by the machine learning system's other processes.

The pre-processing process 320 of the machine learning system 200 uses sub-processes for downsampling, outlier removal, random sample consensus (RANSAC) and classification. The pre-processing process 320 establishes planes and normals within a point cloud created from the data received from the data collection devices.

The downsampling sub-process 322 of the pre-processing process 320 downsamples the data to reduce its file size for data storage purposes and to facilitate further processing of the data by reducing its file size. By reducing the file size of the data via downsampling, the machine learning system 200 is able to perform additional processing of the data more quickly, which improves the functioning of the machine learning system, for example, by reducing the amount of data that must be processed.

The outlier removal sub-process 324 of the machine learning system's pre-processing process 320 removes data that the outlier removal sub-process deems irrelevant to the digital model 510 of the indoor space 50 (or another space). For example, any data (e.g., lidar point cloud or mesh data) that is outside of the indoor space is not needed and is removed, including, for example, data in a point cloud or mesh that is outside of the planes of the indoor space. In some embodiments, the outlier removal sub-process 324 may also remove data related to certain objects 60 present in the indoor space 50 when it is photographed or scanned by the camera 14, lidar device 16, or other scanning devices 16 of the user device 12. Such objects 60 present in the indoor space 50 that are photographed or scanned, and for which the outlier removal sub-process 324 may remove data related to them, can include data related to certain furniture, home décor, and miscellaneous items present in the indoor space. In some instances when desired, control settings of the machine learning system 200 may be adjusted so that all digital objects 514 representing real objects 60 present in the indoor space 50 are treated as outlier data that the outlier removal sub-process 324 removes. In other instances, the control setting may be adjusted so that furniture (or furniture of a certain size, dimensions, or shape, e.g., small furniture such as an occasional table, end table, or ottoman) is treated as outlier data that the outlier removal sub-process removes. In still other instances, the control settings may be adjusted so that home décor items (or home décor items having a certain size, dimensions, or shape) are treated as outlier data that the outlier removal sub-process removes. Examples of home décor items are provided elsewhere herein. In yet other instances, the control settings may be adjusted so that miscellaneous items are treated as outlier data that is removed by the outlier removal sub-process. Miscellaneous items include items of clothing, paper, books, photographs and frames, and other items that are not furniture or home décor. Generally, such miscellaneous items are smaller than furniture and home décor items. The control settings may be adjusted so that photograph and scanned data pertaining to one or more of furniture, home décor items, and miscellaneous items are treated as outlier data and removed by the outlier removal sub-process. In certain instances, the outlier removal sub-process 324 may analyze the data to identify structural elements 52 of the indoor space 50 (e.g., walls, floors, ceilings, doors, windows, and built-in cabinetry or bathroom vanities) so that the outlier removal sub-process makes a determination to remove and does remove all other data not related to those structural elements.

Control settings are accessible via a user interface that is viewable on a display screen that is communicatively connected to the user computing device 12, the remote computing device 20, or another computing device.

In some examples of the machine learning system 200, the control settings may be adjusted to turn on or off the outlier data removal sub-process 324 based on color of objects photographed or scanned in the indoor space. For example, the outlier removal sub-process 324 may be programmed to make a determination that all items (or only items of a certain type) that are a certain color or color range are outlier data and to remove such outlier data from the digital model. In another example, the outlier removal sub-process 324 may be programmed to make a determination that all items (or only items of a certain type) that are not a certain color or color range are outlier data and to remove such outlier data from the digital model.

The RANSAC sub-process 326 determines the parameters of the digital model 510 of the indoor space 50. The RANSAC sub-process 326 may also determine the parameters of digital objects representing real objects (e.g., furniture or home décor) detected within the indoor space when the camera, lidar device, and any other scanning devices of the computing device photograph or scan the indoor space. The outlier removal sub-process 324 and the RANSAC sub-process 326 may perform their functions in a manner that is complementary, conjunctive, or synergistic to one another. For example, the outlier removal sub-process 324 removes much of the outlier data from the digital model while the RANSAC sub-process 326 determines the parameters of the indoor space as represented in planes of the point cloud or mesh so that together these sub-processes refine the digital model to a more accurate representation of the indoor space it is intended to represent.

The classification sub-process 328 classifies the data to add a classification relating to a type of the object in the indoor space. For example, the classification sub-process 328 can semantically segment the data to determine a class label for each object detected in the space. In some implementations, classification sub-process 328 uses Open3D and/or PointNet++ to segment (at least a portion) of the data to add the class labels.

The planes process 330 of the machine learning system 200 uses sub-processes 332 to fix holes and gaps in planes of the digital model 510. The planes process 330 creates a digital model of the indoor space from the pre-processed data received from the pre-processing process 320. The planes process 330 creates planes in the digital model 510 that correspond to real structural elements 52 of the indoor space 50, thereby further refining the digital model to a more accurate digital representation of the indoor space. The planes process 330 may also identify one or more digital objects 514 that are not structural elements in the digital model and create a bounding box around each of the one or more digital objects to prevent the one or more digital objects from colliding with and overlapping one another and the structural elements in the digital model. As shown in FIGS. 1 and 2, each of the one or more digital objects 514 can be a visual object representation corresponding to a shape and dimensions of a real object 60 located in the indoor space 50. The bounding box prevents digital objects (such as visual object representations) from passing through or behind or otherwise overlapping planes detected by the pre-processing and planes processes in analyzing the point cloud data to create structural elements in the digital model. For example, such bounding boxes can prevent a digital object representing a sofa from occupying the same screen space within the digital model as an adjacent wall or table, which would cause the sofa to appear visually to pass partially through the wall or table. The bounding boxes can prevent overlap or merging of objects irrespective of what the object is. That is, the system can prevent any bounding boxes from occupying the same portion of the digital space.

The MTO process 340 of the machine learning system 200 positions the digital model 510 at an origin point within a digital environment 500 of the system 200 to align the digital model to a default camera view. The digital environment 500 may be visually represented for display on a display screen that is communicatively connected to a computing device (e.g., the user computing device, the remote computing device, or another computing device). The default camera view can be a digital point of view from which the digital model is viewed that is programmed in the machine learning system 200. Alternatively, the default camera view can be a digital point of view in the digital model that corresponds to a real point of view from which the at least one data collection device photographed or scanned the indoor space to collect the data that is processed into the digital model. In some cases, scanned data could be rotated, floating above a ground plane, or appear far away from the camera. The MTO process 340 corrects these problems with scanned data by moving and aligning the digital model 510 of the indoor space 50 to an origin (i.e., a 0, 0, 0) point in the digital environment 500 within which the digital model exists. The MTO process 340 operates to correct alignment problems before the segmentation process finds and segments walls, floors, ceilings, and objects in the digital model. The MTO process 340 may not be included in all embodiments of the machine learning system 200.

The segmentation process 350 of the machine learning system 200 defines structural elements 512 in the digital model 510 that correspond to the real structural elements 52 of the indoor space 50. The segmentation process 350 finds and segments floors, ceilings, walls, and other structural elements 512 in the digital model 510 and also detects objects 514 within the digital model. The segmentation process 350 defines structural elements and objects in the digital model by making an identification determination for each plane and object in the digital model. The identification determination is an identification that a plane is a boundary plane of the space being represented, such as a floor, ceiling, wall, or another structural element of the indoor space or an identification that an object is detected in the digital model that does not correspond to one of the boundary planes representing real structural elements of the indoor space. Thus, in analyzing the point cloud or mesh data, the segmentation process 350 will make a wall determination when it detects a plane in the data that corresponds to a wall in the indoor space, a ceiling determination when it detects a plane in the data that corresponds to a ceiling in the indoor space, a floor determination when it detects a plane in the data that corresponds to a floor in the indoor space, and an object determination when it detects a digital object in the digital model that does not correspond to a structural element. The segmentation process 350 creates segmented point clouds and segmented meshes.

The machine learning system 200 can include a control setting that allows for digital object removal from a digital model 510. When the digital model 510 is to represent an empty indoor space in which new furniture and home décor are to be placed, the object removal control setting permits rapid removal of all digital objects 514 from the digital model that are not structural elements 512. A furniture retailer, interior designer, or another user can then use the system to add digital objects representing other furniture or home décor to the digital model to provide a visual representation of how the indoor space would appear with the new proposed furnishings.

FIG. 6 shows an example of machine learning processes 600 that can be performed by the machine learning system 200 to generate a digital model 510 of a space 50. In particular, the machine learning process 600 provides an accurate and efficient method for analyzing a point cloud representation of the space 50 to isolate the planes of the space 50 and segment one or more objects 60 present in the space 50. FIGS. 8A-8E are images depicting various stages in processing an example point cloud using the machine learning process 600. As a visual aid, reference will be made to FIGS. 8A-8E while describing the machine learning process 600.

Operations of the machine learning process 600 can be implemented, for example, by the remote computing device 20 of the system 10 shown in FIG. 1 or another data processing apparatus. Operations of the machine learning process 600 can also be implemented as instructions that are stored on one or more non-transitory computer readable medium, and upon execution, the instructions can cause one or more data processing apparatus or computing devices to perform operations of the machine learning process 600.

The process 600 includes obtaining a 3D scan 40 of a space 50. As mentioned above (e.g., with respect to FIG. 4), the scan 40 can be provided by a user device 12 through a user interface 220. The scan 40 includes a point cloud 41 representation of the space 50. The point cloud 41 can be collected by a remote sensing device 16, e.g., a lidar device, that is, in some implementations, an integrated component of the user device 12.

Figure 8A:
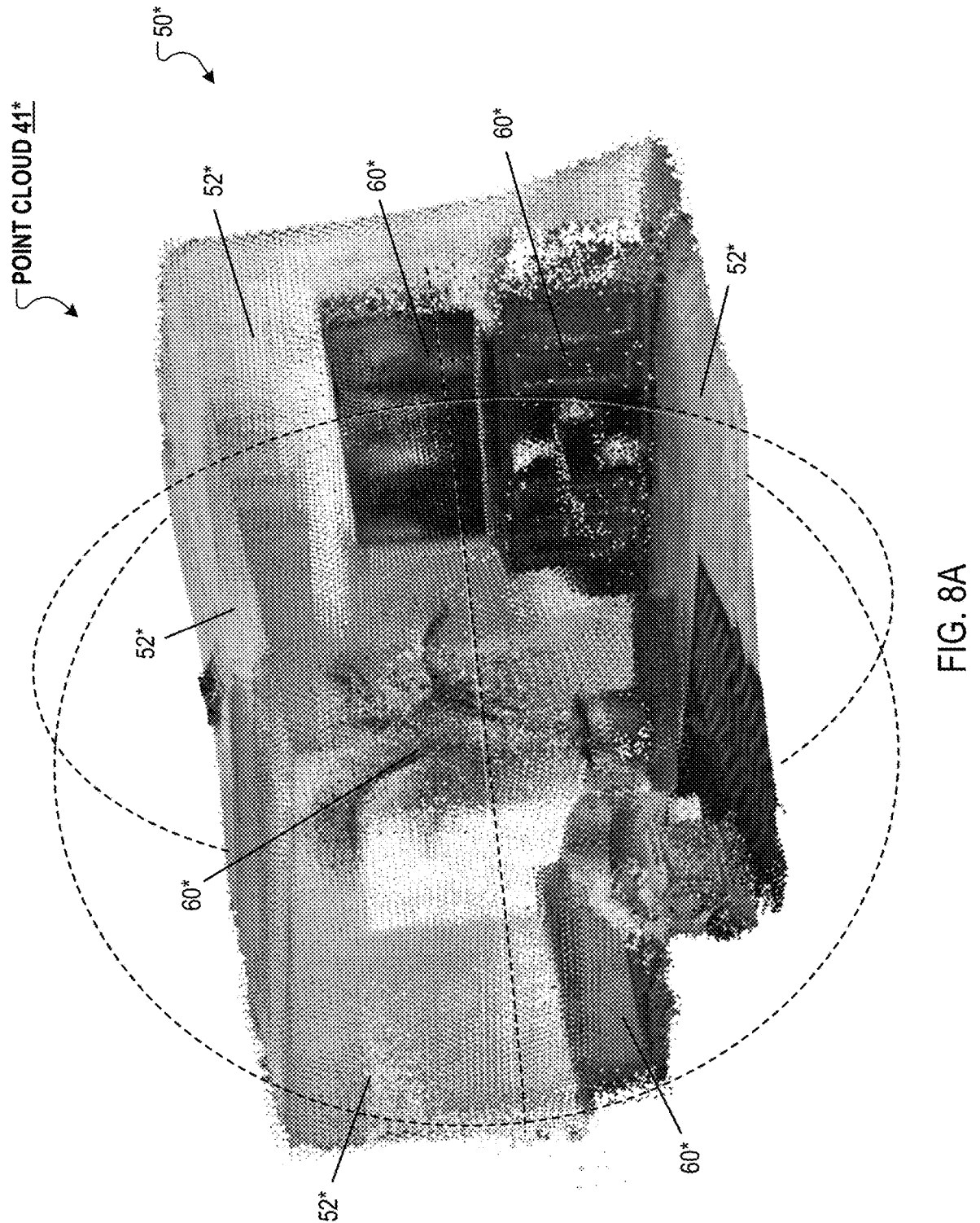
FIGS. 8A-8E are images depicting various stages in processing a point cloud representation of a space to generate a digital model of the space.

FIG. 8A shows an example of a point cloud 41* representation of a particular space 50*. As seen in FIG. 8A, the point cloud 41* includes numerous points characterizing the surfaces of the floor, ceiling, and walls (structural elements 52*) of the space 50* as well as multiple objects 60* in the space 50*.

The point cloud 41 includes multiple points corresponding to multiple measurements of the space 50 (e.g., time-of-flight (ToF) measurements). The measurements characterize the surfaces of structural elements 52 of the space 50 as well as any objects 60 present in the space 50. The measurements generally include distance or depth data that specify the relative distances between points of the point cloud 41. Hence, the points of the point cloud 41 can be defined as coordinates in a coordinate system scaled to the space's physical dimensions. In addition, each point of the point cloud 41 can be associated with other properties such as a respective color, radius, gravity vector, among others.

These properties of the points can provide visual aids as well as additional data for process 600 when processing the point cloud 41. For example, point colors and appropriate point radii can provide a more aesthetically pleasing visual representation of the point cloud 41 than monochromatic and poorly sized points. As another example, the gravity vector and the point colors can be used as additional data when process 600 segments the point cloud 41, e.g., by specifying the direction of the floor plane and providing color (e.g., RGB) identifiers of particular objects.

The process 600 includes a plane detection process 620 for segmenting the point cloud 41 into an inlier point cloud (IPC) 622 and an outlier point cloud (OPC) 621. The IPC 622 includes multiple inlier points and the OPC 621 includes multiple outlier points. The plane detection process 620 identifies, as the inlier points, the points of the point cloud 41 that are likely to be measurements of any of multiple planes of the space 50 (i.e., structural elements 52 of the space 50). For example, the plane detection process 620 can calculate, for each point in the point cloud 41, a probability that the point is a measurement of one of the planes of the space 50. The plane detection process 620 can then identify the point as an inlier point if the probability is at least equal to a specified likelihood (e.g., a threshold probability). Note, the outlier points are all the points of the point cloud 41 excluding the inlier points.

Figure 8B:
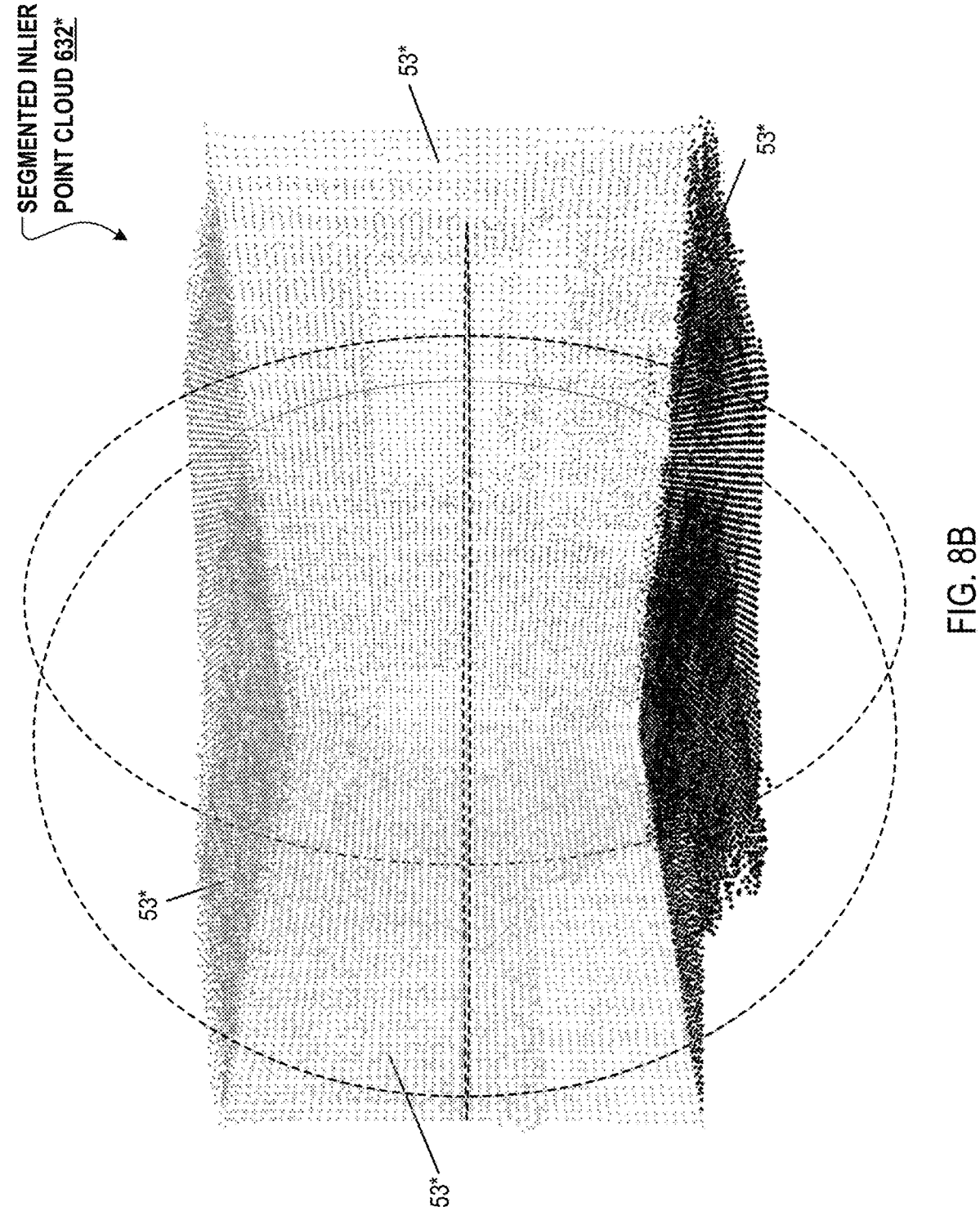
Figure 8C:
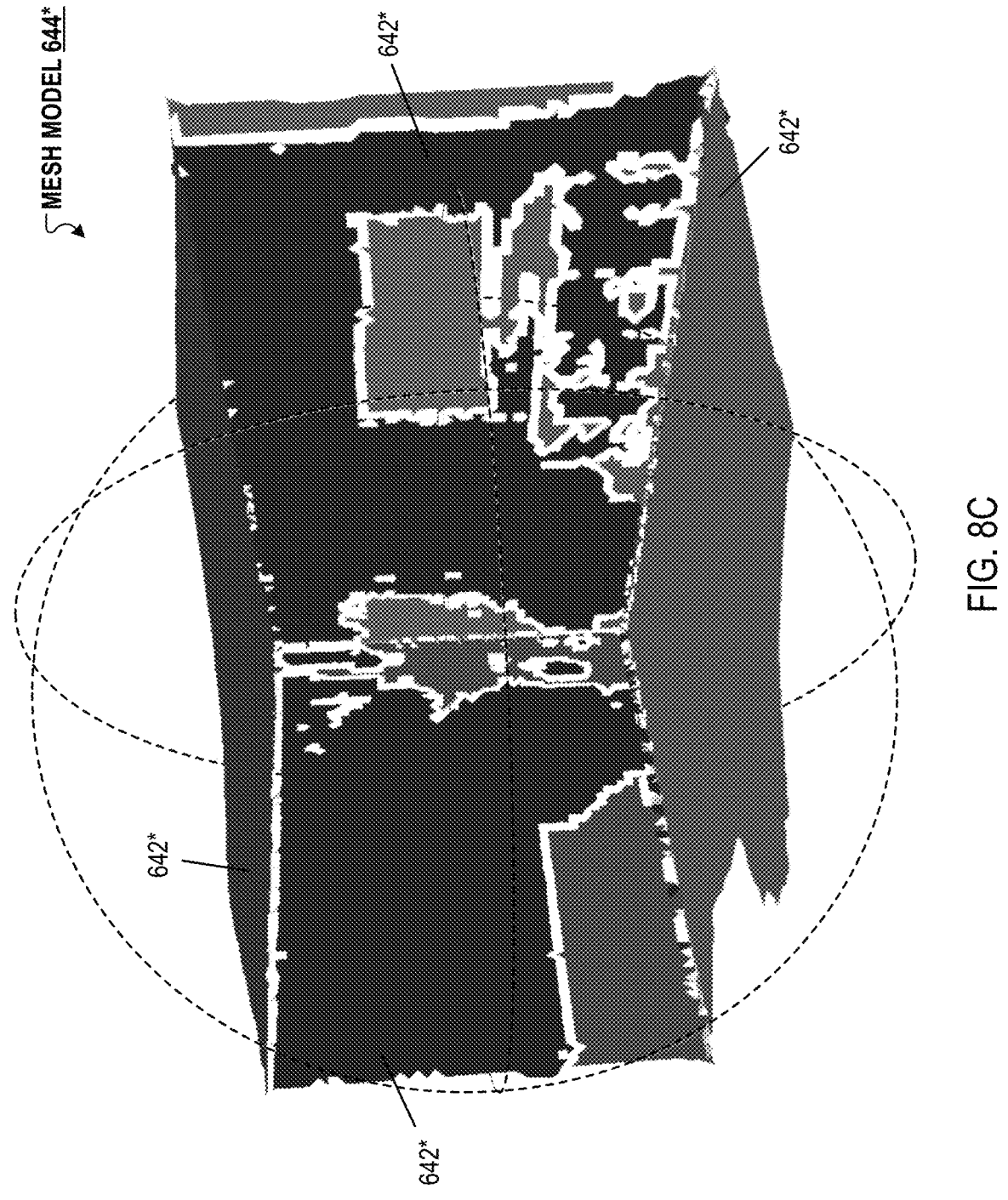
Figure 8D:
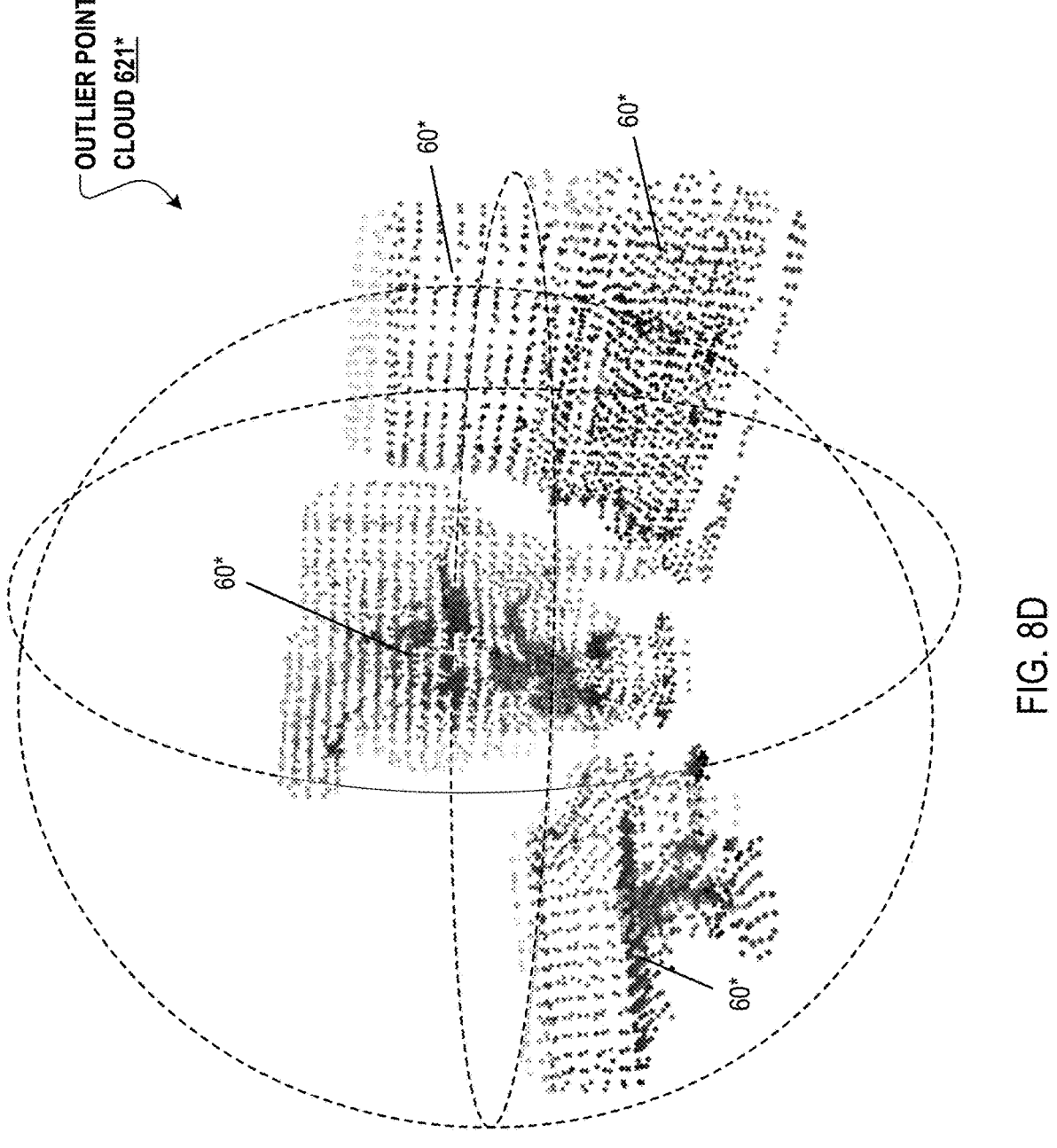

FIG. 8D shows an example of an OPC 621* generated from the point cloud 41* of FIG. 8A. As can be seen in FIG. 8D, the OPC 621* includes outlier points associated with the objects 60* detected to be present in the space 50*.

The plane detection process 620 can use various different algorithms or software packages to identify the inlier points based on a likelihood that the inlier points correspond to a measurement of a plane. For example, plane detection process 620 can use algorithms such as RANSAC (Random Sample Consensus), MLESAC (Maximum Likelihood Estimate Sample Consensus), Monte-Carlo methods, resampling methods, plane-based registration, or combinations thereof. Alternatively or in addition, plane detection process 620 can use software packages such as Open3D and Point-Net++ to identify the inlier points. Due to the predictability and flat geometry of planar surfaces, such algorithms and software packages can be particularly adept at detecting the planes of the space 50 as measured by the point cloud 41.

Many inlier detection algorithms involve analyzing linear relations between sets of points of the point cloud 41 and determining whether a certain set of points accurately model a plane (e.g., in a least-squares sense). For example, in a RANSAC implementation, the plane detection process 620 can fit plane equations to several random samplings of points of the point cloud 41 and return the plane equation that has the best fit to a particular sample of the points. Plane detection process 620 can then identify this particular sample of points as inlier points. Since the inlier points tend to be more linearly related than a random mixture of inliers and outliers, a random sample that is entirely (or almost entirely) inliers will generally have the best fit of a plane equation. Plane detection process 620 can repeat this process until all the inlier points associated with measured planes of the space 50 are identified.

In some implementations, to ensure that planar surfaces of objects such as tables or desks are not identified as inlier points, plane detection process 620 can set a minimum number of points to be associated with a measured plane and/or specify the outermost identified inlier points as planes. For example, if a plane is detected between two other planes, such a plane is likely associated with an object 60 as opposed to a structural element 52.

As the inlier points correspond to likely measurements of the planes 52 of the space 50, the outlier points correspond to likely measurements of any objects 60 present in the space 50, as outlier points are not associated with the structural elements 52 of the space 50. Hence, the plane detection process 620 can also be understood as an object detection process. In other words, the plane detection process 620 identifies, as the outlier points, the points of the point cloud 41 that are likely to be measurements of any of one or more physical objects 60 present in the space 50. Note though, since the 3D scan 40 typically includes unstructured point clouds (e.g., unordered, unlabeled), plane detection process 620 generally cannot determine the number of objects or the type of objects detected (e.g., semantically segment the objects), only that objects are present in the space 50. This segmentation step is performed by a suitably trained neural network 630, as is described below.

The process 600 includes a plane correction process 650 for correcting holes and gaps in the IPC 624 representing the planes of the space 50. The plane correction process 650 generates a corrected IPC that fully characterizes the surfaces of the planes measured by the point cloud 41, and as such, improves the ability of a computer to digitally represent the boundaries of a space, for example, when the boundaries of the space are not directly scanned. That is, although the inlier points of the IPC 622 may fit the equation of a plane (or multiple planes) as determined by the plane detection process 620, there may be regions of the IPC 622 that lack sufficient points to represent the complete extent of the plane (and therefore may be ill-suited to generate a mesh model from). For example, the IPC 622 may lack sufficient points due to an incomplete scan 40 of the space 50, objects obscuring the floor, ceiling, or walls of the space 50, or due to certain physical properties of the scanned surface, e.g., transparency of windows, reflectivity of mirrors, etc. Consequently, the inlier points of IPC 622 may not fully characterize the surfaces of the structural elements 52 of the space 50, e.g., up to a threshold density of points across the entire surface. To remedy this, the plane correction process 650 can add auxiliary, artificially generated points to the regions of the IPC 622 lacking sufficient points in order to fill the holes and gaps. In some implementations, the plane correction process 650 can average the colors of inlier points associated with a particular plane to generate auxiliary points that match the colors of the surrounding inlier points.

Plane correction process 650 can implement various algorithms to perform hole and gap correction such as ray-casting (hit-testing) methods, triangulation (mesh) methods, meshless methods, or combinations thereof. All of which can detect the boundaries of holes or gaps, with some methods being preferable in certain situations. For example, in a triangulation implementation, the plane correction process 650 can generate a triangulation (e.g., a Delaunay triangulation) of the IPC 622 to generate edges connecting neighboring inlier points. The edges of holes that belong to only one triangle are then extracted by plane correction process 650 and identified as boundary edges of a hole. Plane correction process 650 can connect these boundary edges end-to-end to form a closed loop, thereby realizing the detection of a hole boundary of the IPC 622. Plane correction process 650 can then iteratively add auxiliary points to the hole until no edges of the IPC 622 triangulation belong to a single triangle. In some implementations, plane correction process 650 can generate an array of auxiliary points simultaneously (e.g., with fixed spacing between points) that fills the interior of the hole boundary and position the array within the hole.

Plane correction process 650 can also use the intersections of planes, e.g., by extrapolating plane equations fitted to the inlier points, to aid in hole and gap detection and correction. For example, the intersection of two plane equations (a line) can be used by plane correction process 650 as a boundary edge for triangulation methods. As another example, the intersection of three plane equations (a corner) can be used by plane correction process 650 for ray-casting methods (e.g., using Unity's AR Raycast Manager). In particular, plane correction process 650 can use multiple corners to define the overall extent of a plane as represented by the IPC 622 and then cast rays at the plane from multiple angles in order to determine if the rays intersect an inlier point (or the neighborhood of an inlier point). Plane correction process 650 can scan the IPC 622 with rays until an intersection is avoided, thereby detecting a hole boundary.

Note, a hole in the IPC 622 corresponding to a window or mirror may involve special attention by plane correction process 650. For example, such a hole may not be completely void of inlier points (e.g., due to a low but non-zero number of reflections back to a lidar device 16) but lacks a sufficient number of points to generate a suitable mesh model. In this case, the plane correction process 650 may detect the hole boundary, remove any inlier points in its interior, and subsequently fill the hole with auxiliary points. In some implementations, instead of removing inlier points, plane correction process 650 can iteratively fill the hole with auxiliary points until the hole is adequately filled.

The process 600 includes a plane segmentation process 660 for segmenting the corrected IPC into a segmented IPC 632. Since the holes and gaps in the IPC 622 are filled, plane segmentation process 660 can associate a respective point cloud to each of the planes of the space 50 to identify, for example, the boundaries of the space 50 as represented by the corrected IPC. In particular, the segmented IPC 632 includes, for each measured plane of the space 50, a respective plane point cloud representing the plane. The plane point clouds representing the planes of the space 50 can classify the planes based on any desired criterion. For example, each point of a plane point cloud can be associated with a plane class label 635 defining a type of plane (e.g., a floor, a ceiling, or a wall) of the space 50. In some implementations, the class labels 635 are not associated with plane types but instead classify the planes in terms of properties of the planes, e.g., that the planes are perimeters or boundaries of the space 50. The class labels 635 can correspond to values (e.g., indices) that reference elements of a class table. To segment the corrected IPC into the segmented IPC 632, plane segmentation process 660 can use various algorithms and software packages such as those discussed above for the plane detection process 620.

FIG. 8B shows an example of a segmented IPC 632* generated from the point cloud 41* of FIG. 8A. As can be seen in FIG. 8B, the segmented IPC 632* includes a respective plane point cloud 53* representing each measured plane 52* of the space 50*. Any holes and gaps in the inlier points (e.g., corresponding to inlier point densities below a specified threshold) have been corrected.

In some implementations, process 600 generates a bounding box around the segmented IPC 632. In this case, the bounding box is generally the smallest cuboid (or 3D shape) that encloses all the points of the segmented IPC 632, defining the overall extent of the digital model 510 that is subsequently generated from the segmented IPC 632. Specifically, process 600 generates a bounding box that encloses all the points of the plane point clouds representing the planes of the space 50. This can be particularly useful if the 3D scan 40 does not include measurements of every plane 52 of the space 50 since the bounding box can generate a "fictitious" boundary (e.g., an invisible wall or sky plane) in the digital model 510 for planes that were not captured in the 3D scan 40.

In some implementations, process 600 uses the bounding box around the segmented IPC 632 to identify outlier points of the OPC 621 that are not associated with objects within the space 50. For example, outlier points outside the confines of the bounding box can be identified by process 600 as extraneous (or artifacts) and can be removed from the OPC 621. Extraneous points may correspond to time-of-flight measurements of a lidar device 16 that passed through a window of the space 50, reflected off an object (e.g., a tree or vehicle) outside the space 50, and returned through the window to the lidar device 16. In the case of an outdoor space, extraneous points can be more prevalent as outdoor spaces can lack boundaries (e.g., one or more walls and/or a ceiling) that mitigate the collection of these points. Process 600 can significantly refine OPCs associated with outdoor spaces using bounding boxes.

The process 600 includes a neural network 630 configured to receive a point cloud as input and to process the point cloud to generate a segmented point cloud as output. In this case, the neural network processes the OPC 621 to generate a segmented OPC 631 for purposes of object segmentation. In particular, the segmented OPC 631 includes, for each of one or more objects detected in the space 50, a respective object point cloud representing the object. The object point clouds representing the objects in the space 50 can classify the objects based on any desired criterion. For example, each point of an object point cloud can be associated with an object class label 633 defining a type of object (e.g., a desk, a chair, a bed, a lamp, a table, etc.) in the space 50. In some implementations, the class labels 633 are not associated with object types but instead classify the objects in terms of properties of the objects, e.g., that the objects are moveable within the space 50 and/or removable from the space 50. Similar to the plane class labels 635, the object class labels 633 can correspond to values (e.g., indices) that reference elements of a class table.

In general, the neural network 630 performs segmentation by encoding the OPC 621 into a lower dimensional space that facilitates highly efficient feature extraction (e.g., object segmentation). The neural network 630 then performs feature detection on the encoded OPC in this lower dimensional space. After extracting features, the neural network 630 decodes the encode OPC to generate the segmented OPC 631 that includes the segmented object point clouds. As is described below, the neural network 630 is pre-trained on a training data set to detect such features. Typically, the size of the neural network 630 model (e.g., the number of layers and/or network parameters) dictates the amount of information the neural network 630 can retain from the training dataset to perform object segmentation. When appropriately sized and trained, the neural network 630 can perform highly accurate and efficient object segmentation, even on noisy point clouds. Such training is described below with respect to FIG. 7.

In general, the neural network 630 can include any appropriate types of neural network layers (e.g., fully-connected layers, convolutional layers, attention layers, etc.) in any appropriate numbers (e.g., 5 layers, 25 layers, or 100 layers) and connected in any appropriate configuration (e.g., as a linear sequence of layers) that enables the neural network 630 to perform its chosen function. In some implementations, the neural network 630 is a PointNet++ architecture which is a particularly adept neural network for analyzing point clouds as well as for implementing training regimes on particular data sets.

In some implementations, process 600 generates a bounding box around each of the object point clouds of the segmented OPC 631. In this case, each bounding box is generally the smallest cuboid (or 3D shape) that encloses all the points of a respective object point cloud, defining the overall extent of a respective digital object 514 that is subsequently generated from the object point cloud. The bounding boxes can prevent the digital objects from passing through one another as well as through any digitally generated planes of the digital model.

Figure 8E:
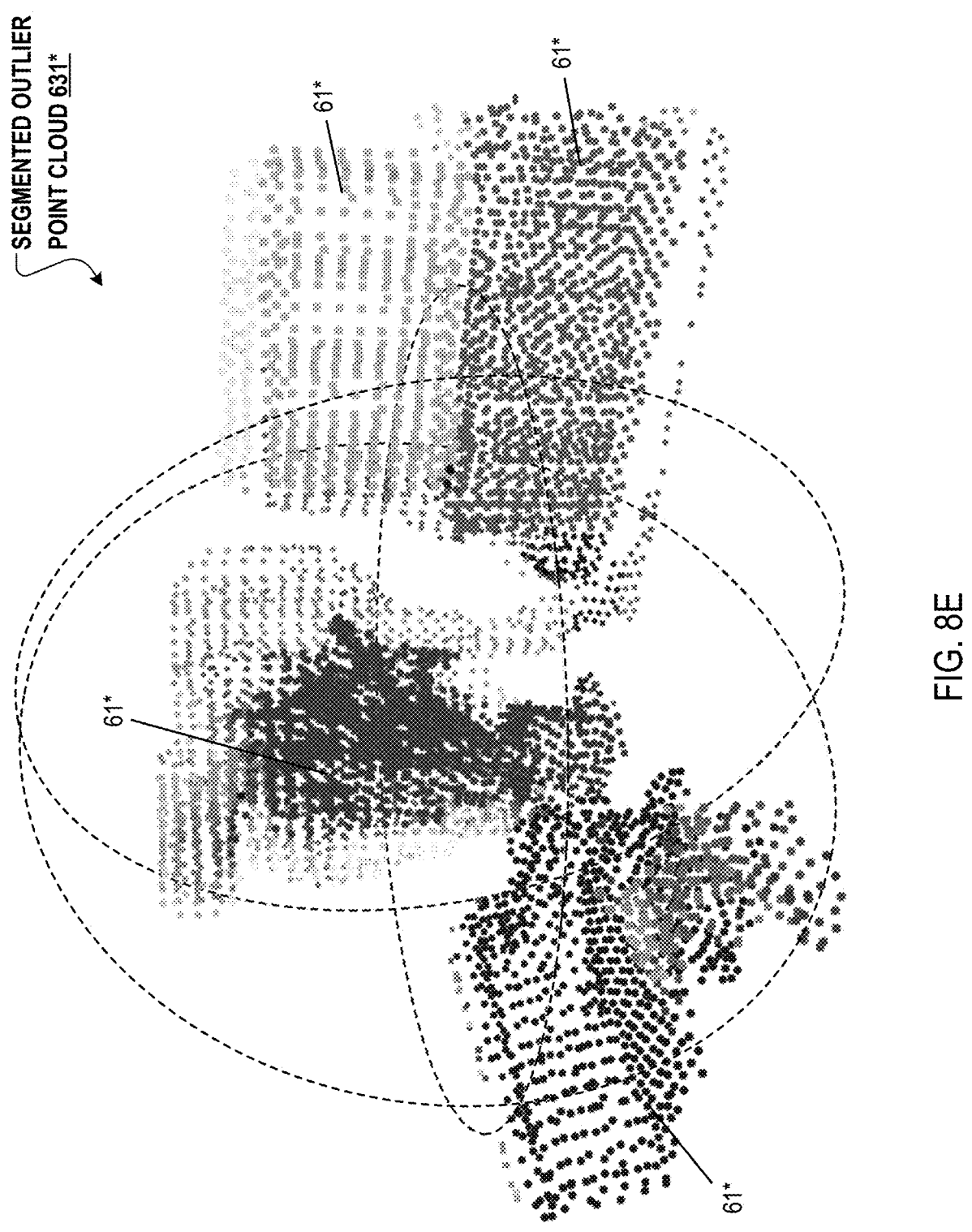

FIG. 8E shows an example of a segmented OPC 631*  generated from the OPC 621* of FIG. 8D. As can be seen in FIG. 8E, the segmented OPC 631*  has been segmented such that each detected object 60* is represented by their respective object point cloud 61*. The process 600 has also assigned respective shades to the segmented object point clouds 61* as a visual aid.

The process 600 includes a mesh process 640 for generating a mesh model 644 of the space 50. In particular, the mesh process 640 generates meshed planes 642 from the segmented IPC 632 and meshed objects 641 in the mesh model 644 from the segmented OPC 631. The mesh model 644 can provide a more appealing reconstruction of the space 50 by generating unbroken surfaces, as well as facilitating collision detection. That is, the mesh model 644 can be generated by mesh process 640 as a collision-based mesh. Each meshed plane corresponds to (e.g., represents) a respective plane point cloud included in the segmented IPC 632. Each meshed object corresponds to (e.g., represents) a respective object point cloud included in the segmented OPC 631. Mesh process 640 can use various different meshing algorithms (e.g., Deluany triangulation) to generate different types of meshes (e.g., polygon or triangle meshes) from the point clouds. Mesh process 640 can also use software packages such as Open3D, Python, MatLab, Point-Fuse, among others to generate the mesh model 644 as well as implement collision detection.

FIG. 8C shows an example of a mesh model 644* of the space 50* generated from the segmented IPC 632* of FIG. 8B. The mesh model 644* includes meshed planes 642*  representing structural elements 52* of the space 50*. As can be seen in FIG. 8C, the meshed planes 642* provide flush surfaces and a convenient means to constrain objects within the mesh model 644* by means of collision detection.

In some implementations of the process 600, the 3D scan 40 can include one or more images 42 depicting the space 50. The images 42 can be captured by a camera 14 of the user device 12 from one or more vantage points. In some cases, the camera 14 captures the images 42 simultaneously while the lidar device 16 generates the point cloud 41, both of which integrated in the user device 12. The process 600 uses the images 42 to provide photographic recreations of the space 50.

Process 600 generates the digital model 510 of the space 50 and one or more digital objects in the digital model 510 by overlaying the images 42 onto the mesh model 644. In particular, process 600 generates multiple digital planes 512 of the digital model 510 representing the planes of the space 50 by overlaying the images 42 onto the meshed planes 642. Similarly, process 600 generates the digital objects 514 representing one or more physical objects 60 in the space 50 by overlaying the images 42 onto the meshed objects 641. Process 600 can use software packages such as Unity, WebGL, Blender, or other 3D rendering software to generate the digital model and the digital objects. In some implementations, the process 600 can determine appropriate image corrections for a digital plane 512 of the digital model 510 if the corresponding plane of the space 50 was not completely captured in the images 42. For example, process 600 can average the pixel colors in the images 42 associated with the plane and subsequently overlay the average color on any regions in the digital plane associated with uncaptured regions of the plane.

In some implementations, process 600 includes providing the digital model 510 including the one or more digital objects for presentation in a user interface 220 on the user device 12.

Figure 7:
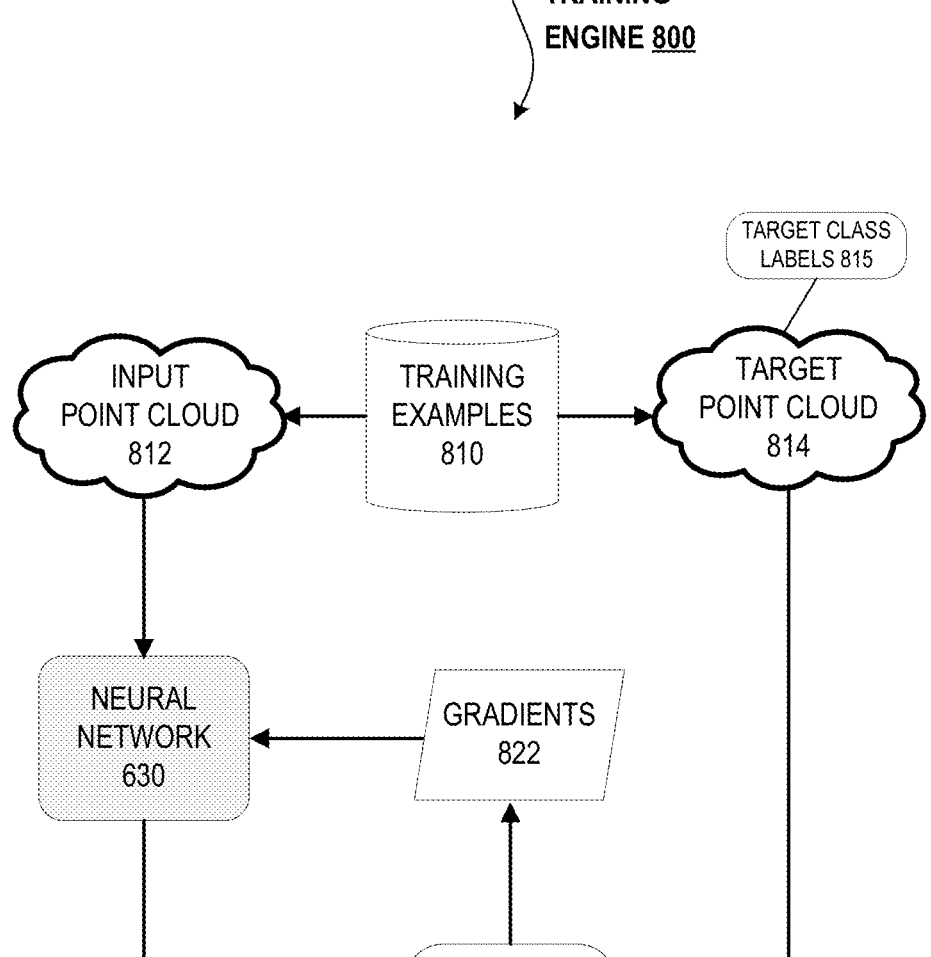
FIG. 7 shows an example of a training engine that can train a neural network of a machine learning system to perform segmentation tasks on point clouds.

FIG. 7 shows an example of a training engine 800 that can be used to train the neural network 630 of the machine learning system 200. The training engine 800 includes multiple training examples 810 that each include a respective input point cloud 812 and a corresponding target point cloud 814. The input point clouds 812 are unsegmented point clouds. The target point clouds 814 are object segmented versions of the input point clouds 812. For example, an input point cloud 812 can be a point cloud representation of multiple target objects but includes no labeling, structure, or identification of the target objects. In contrast, the target point cloud 814 associated with said input point cloud 812 includes object point clouds that identify and represent each of the target objects. In some implementations, a target point cloud 814 can include respective class labels 815 for each of its object point clouds, for example, that specify a type of object represented by the object point clouds or that the objects have some property (e.g., are moveable within a space, removable from a space, positionable on a certain set of objects, positionable on certain planes, etc.).

Generic object properties can be advantageous over object types (e.g., couches, lamps, chairs, tables, etc.) as this can reduce the number of parameters the neural network 630 dedicates to classification. Moreover, the neural network 630 can be trained to more efficiently segment different objects in a point cloud based on the overall structure of the point cloud as opposed to features characterizing different types of objects represented in the point cloud. In other words, the neural network 630 can be trained to identify that certain sets of points of a point cloud are associated with distinct objects but may not be able to determine what those objects are. This type of segmentation is generally less computationally expensive than object type segmentation and can be more effectively applied to noisy and/or sparse point clouds where precise characterizing features of the objects are not present. Furthermore, in the context of the system 10, the neural network 630 is generally implemented to isolate objects 60 in space 50 that are moveable and/or removable from the space 50 which can forgo object type classifications.

The training examples 810 can include point clouds obtained from lidar scans of real objects. The training examples 810 can also include point clouds generated from 3D models of real or artificial objects (e.g., a catalogue of products). For example, the training engine 800 can generate point clouds from computer-aided design (CAD) models of furniture and other objects that may or may not be associated with real objects. Such synthetic training data can be advantageous when training engine 800 does not have immediate access to lidar scans of real objects and/or a large training set is desired for the neural network 630.

The neural network 630 processes the respective input point cloud 812 of each training example 810 to generate a corresponding output point cloud 816 for the training example 810. Before neural network 630 is adequately trained, the output point clouds 816 are approximate, segmented versions of the input point clouds 812. That is, an output point cloud 816 can include object point clouds that identify and represent objects that the neural network 630 predicts are included in a respective input point cloud 812. Training engine 800 generally aims to align the predicted objects with the target objects to train the neural network 630 towards accurate object segmentation. Note, if the target point clouds 814 include class labels 815, the output point clouds 816 also includes class labels 817 that estimate, for example, a type of object or other property of an object.

To train the neural network 630 towards accurate object segmentation, training engine 800 can use an objective function 820 that depends on the respective output 816 and target 814 point clouds of each training example 810. In particular, the objective function 820 can include terms that measure an error (e.g., a mean-squared error) between each respective output 816 and target point cloud 814. For example, in the case of class labels, the objective function 820 can measure the error between the class labels 817 assigned to the points of the output point cloud 816 and the known class labels 815 of the points in the target point cloud 814.

Training engine 800 can use the objective function 820 to update a set of network parameters of the neural network 630. For example, the training engine 800 can calculate gradients 822 of the objective function 820 with respect to the network parameters and use the gradients 822 to update the values of the network parameters, e.g., using a gradient descent method or other optimization technique.

In some implementations, training engine 800 injects noise into the training examples 810 to simulate real-world point cloud collection conditions. For example, training engine 800 can generate randomly translate points (e.g., generate noisy points), generate holes and gaps in certain regions of points (e.g., to simulate occluded regions), remove points (e.g., reduce the density of points), or otherwise deteriorate the quality of the input 812 and target 814 point clouds such that the neural network 630 is trained to perform object segmentation on low-quality, i.e., noisy, data. This can provide the machine learning system 200 with a robust framework for object segmentation without the need to pre-process or clean 3D scans.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for generating a digital model of a space and modifying the digital model, the system comprising one or more computers and one or more storage devices storing instructions that, when executed by the one or more computers, cause the one or more computers to perform operations comprising:

obtaining a point cloud representation of the space, the point cloud comprising a plurality of points;

segmenting the point cloud into: (i) an inlier point cloud comprising a plurality of inlier points, and (ii) an outlier point cloud comprising a plurality of outlier points, wherein the segmenting comprises:

identifying, as the inlier points, the points of the point cloud that have at least a specified likelihood of being measurements of any of a plurality of planes of the space; and identifying, as the outlier points, all other points of the point cloud that are not identified as the inlier points;

processing the inlier point cloud to generate a segmented inlier point cloud that comprises, for each measured plane of the space, a respective plane point cloud representing the plane; and processing, using a neural network, the outlier point cloud to generate a segmented outlier point cloud that comprises, for each of one or more objects detected in the space, a respective object point cloud representing the object, wherein the respective object point cloud representing at least one of the objects in the space classifies each the at least one of the objects as moveable within the space by a user.

2. The system of claim 1, wherein the plane point clouds representing the planes of the space classify each of the planes as a boundary of the space.

3. The system of claim 1, wherein the object point cloud representing a given object in the space classifies the given object as removable from the space by a user presented with a visual representation of the space.

4. The system of claim 1, wherein the operations further comprise generating a mesh model of the space that comprises:

generating, from the segmented inlier point cloud, a plurality of meshed planes of the mesh model representing the planes of the space; and generating, from the segmented outlier point cloud, one or more meshed objects in the mesh model representing the one or more objects in the space.

5. The system of claim 4, wherein the operations further comprise:

obtaining one or more images depicting the space;

overlaying the one or more images onto the mesh model and the one or more meshed objects in the mesh model to generate:

a plurality of digital planes of the digital model representing the planes of the space; and one or more digital objects in the digital model representing the one or more objects in the space; and providing the digital model including the one or more digital objects for presentation in a user interface on a user device.

6. The system of claim 5, wherein the operations further comprise:

receiving, through the user interface, a user input corresponding to a selection of a selected digital object among the one or more digital objects in the digital model; and removing the selected digital object from the digital model presented in the user interface based on a class label of the one of the one or more digital objects indicating that the one of the one or more digital objects is removable from the digital model presented in the user interface.

7. The system of claim 5, wherein the operations further comprise:

presenting, through the user interface, a plurality of new digital objects available to be added to the digital model;

receiving, through the user interface, a user input corresponding to a selection of a selected new digital object among the new digital objects; and adding the selected new digital object to the digital model presented in the user interface.

8. The system of claim 5, wherein the point cloud representation of the space and the one or more images depicting the space are obtained by the system through the user interface.

9. The system of claim 1, wherein the neural network is trained on a plurality of training examples that each include: (i) a respective input point cloud, and (ii) a corresponding target point cloud that comprises, for each of one or more target objects, a respective object point cloud representing the target object, and wherein training the neural network comprises:

processing, using the neural network, the respective input point cloud of each training example to generate a respective output point cloud that is an estimate of the corresponding target point cloud;

determining gradients of an objective function that characterizes an error between the respective output and target point clouds of each training example; and using the gradients of the objective function to update a set of network parameters of the neural network.

10. The system of claim 9, wherein the respective input and target point clouds of at least some of the training examples include noisy data.

11. A method performed by one or more computers for generating a digital model of a space and modifying the digital model, the method comprising:

obtaining a point cloud representation of the space, the point cloud comprising a plurality of points;

segmenting the point cloud into: (i) an inlier point cloud comprising a plurality of inlier points, and (ii) an outlier point cloud comprising a plurality of outlier points, wherein the segmenting comprises:

identifying, as the inlier points, the points of the point cloud that have at least a specified likelihood of being measurements of any of a plurality of planes of the space; and identifying, as the outlier points, all other points of the point cloud that are not identified as the inlier points;

processing the inlier point cloud to generate a segmented inlier point cloud that comprises, for each measured plane of the space, a respective plane point cloud representing the plane; and processing, using a neural network, the outlier point cloud to generate a segmented outlier point cloud that comprises, for each of one or more objects detected in the space, a respective object point cloud representing the object, wherein the respective object point cloud representing at least one of the objects in the space classifies each the at least one of the objects as moveable within the space by a user.

12. The method of claim 11, wherein the plane point clouds representing the planes of the space classify each of the planes as a boundary of the space.

13. The method of claim 11, wherein the object point cloud representing a given object in the space classifies the given object as removable from the space by a user presented with a visual representation of the space.

14. The method of claim 11, further comprising generating a mesh model of the space that comprises:

generating, from the segmented inlier point cloud, a plurality of meshed planes of the mesh model representing the planes of the space; and generating, from the segmented outlier point cloud, one or more meshed objects in the mesh model representing the one or more objects in the space.

15. The method of claim 14, further comprising:

obtaining one or more images depicting the space;

overlaying the one or more images onto the mesh model and the one or more meshed objects in the mesh model to generate:

a plurality of digital planes of the digital model representing the planes of the space; and one or more digital objects in the digital model representing the one or more objects in the space; and providing the digital model including the one or more digital objects for presentation in a user interface on a user device.

16. The method of claim 15, further comprising:

receiving, through the user interface, a user input corresponding to a selection of a selected digital object among the one or more digital objects in the digital model; and removing the selected digital object from the digital model presented in the user interface.

17. The method of claim 15, further comprising:

presenting, through the user interface, a plurality of new digital objects available to be added to the digital model;

receiving, through the user interface, a user input corresponding to a selection of a selected new digital object among the new digital objects; and adding the selected new digital object to the digital model presented in the user interface.

18. The method of claim 15, wherein the point cloud representation of the space and the one or more images depicting the space are obtained through the user interface.

19. The method of claim 11, wherein the neural network is trained on a plurality of training examples that each include: (i) a respective input point cloud, and (ii) a corresponding target point cloud that comprises, for each of one or more target objects, a respective object point cloud representing the target object, and wherein training the neural network comprises:

processing, using the neural network, the respective input point cloud of each training example to generate a respective output point cloud that is an estimate of the corresponding target point cloud;

determining gradients of an objective function that characterizes an error between the respective output and target point clouds of each training example; and using the gradients of the objective function to update a set of network parameters of the neural network.

20. The method of claim 19, wherein the respective input and target point clouds of at least some of the training examples include noisy data.

\* \* \* \* \*